(12) United States Patent
Takayama

(10) Patent No.: US 6,725,450 B1
(45) Date of Patent: Apr. 20, 2004

(54) PROGRAM CONVERSION APPARATUS, PROCESSOR, AND RECORD MEDIUM

(75) Inventor: Shuichi Takayama, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 437 days.

(21) Appl. No.: 09/595,130

(22) Filed: Jun. 16, 2000

(30) Foreign Application Priority Data

Jun. 21, 1999  (JP) ............................................ 11-174708

(51) Int. Cl.$^7$ ................................................ G06F 9/45
(52) U.S. Cl. ........................ 717/139; 717/140; 717/136; 717/146; 717/151
(58) Field of Search ................................ 717/140, 139, 717/146, 151, 153, 143, 154, 136, 40, 150

(56) References Cited

U.S. PATENT DOCUMENTS

| | | | | |
|---|---|---|---|---|
| 4,396,976 A | * | 8/1983 | Hyatt ............................ 700/1 |
| 4,739,470 A | * | 4/1988 | Wada et al. .................. 712/217 |
| 4,945,511 A | * | 7/1990 | Itomitsu et al. ............. 712/212 |
| 5,136,503 A | * | 8/1992 | Takagi et al. ................... 704/2 |
| 5,177,701 A | * | 1/1993 | Iwasa ......................... 712/210 |
| 5,210,832 A | * | 5/1993 | Maier et al. ................. 712/227 |
| 5,579,520 A | * | 11/1996 | Bennett ....................... 717/151 |
| 5,619,507 A | * | 4/1997 | Tsuda .......................... 370/430 |
| 5,699,536 A | * | 12/1997 | Hopkins et al. ............. 712/216 |
| 5,784,631 A | * | 7/1998 | Wise ........................... 382/246 |
| 5,790,874 A | | 8/1998 | Takano et al. |
| 5,809,306 A | * | 9/1998 | Suzuki et al. ............... 717/143 |
| 5,854,935 A | * | 12/1998 | Enomoto ..................... 717/159 |
| 6,014,513 A | * | 1/2000 | Voelker et al. .............. 717/131 |
| 6,023,583 A | * | 2/2000 | Honda ......................... 717/158 |
| 6,115,806 A | * | 9/2000 | Yoshida ....................... 712/210 |
| 6,173,394 B1 | * | 1/2001 | Guttag et al. ............... 712/226 |
| 6,173,442 B1 | * | 1/2001 | Agesen et al. .............. 717/141 |
| 6,215,898 B1 | * | 4/2001 | Woodfill et al. ............. 382/154 |
| 6,363,523 B1 | * | 3/2002 | Chen et al. .................. 717/153 |
| 6,397,323 B1 | * | 5/2002 | Yoshida ....................... 712/212 |
| 6,449,021 B1 | * | 9/2002 | Ohta et al. ................... 348/700 |
| 6,463,582 B1 | * | 10/2002 | Lethin et al. ................ 717/158 |
| 6,490,673 B1 | * | 12/2002 | Heishi et al. ................ 712/213 |
| 6,557,080 B1 | * | 4/2003 | Burger et al. ............... 711/137 |

FOREIGN PATENT DOCUMENTS

| | | |
|---|---|---|
| JP | 8101773 | 4/1996 |
| JP | 8101777 | 4/1996 |
| JP | 10187437 | 7/1998 |

OTHER PUBLICATIONS

TITLE: Program translation device in microprocessor □ has code generation unit which forms machine code that contains instructions of different bit length than that of instruction of high level language, DERWENT□ACC□NO: 1996□380680.*

TITLE: A general□purpose high□level language for mini-computers , author: Bradford W. Wade , Victor B. Schneider, ACM, May 1973.*

TITLE: Superoptimizer: a look at the smallest program, author: Henry Massalin, ACM, Oct., 1987.*

TITLE: Instruction Prefetching of system codes with layout optimized for reduced cache misses, author: Xia et al, ACM, 1996.*

* cited by examiner

Primary Examiner—Chameli Chaudhuri Das

(57) ABSTRACT

A program conversion apparatus including a machine-language storage unit and a conversion unit. The machine-language storage unit stores sets of two or more types of machine-language codes which correspond to components of a predetermined type included in instructions of a source program. The two or more types of machine-language codes in each set have different bit patterns. The conversion unit converts the instructions of the source program into the machine-language instructions. In this conversion, the conversion means converts each predetermined-type component selectively into one of the two or more types of machine-language codes so that the converted machine-language instructions have less digit-bit changes.

3 Claims, 19 Drawing Sheets

PROGRAM CONVERSION APPARATUS 10

FIG. 3

```
        MOV    R0,R1
        CMP    R1,R2
        BEQ    L
        MOV    R2,R3
        ADD    R3,R4
L:      SUB    R4,R5
```

FIG. 4

| ASSEMBLY LANGUAGE | MEANING |
|---|---|
| MOV Rn,Rm | TRANSFER VALUE FROM Rn TO Rm |
| CMP Rn,Rm | WHEN Rn=Rm, F=1, WHEN Rn≠Rm, F=0 |
| BEQ L | JUMP TO L WHEN F=0 |
| ADD Rn,Rm | TRANSFER RESULT OF Rn+Rm TO Rm |
| SUB Rn,Rm | TRANSFER RESULT OF Rn−Rm TO Rm |

FIG. 5

| OPERATION | TYPE-1 OP CODE | TYPE-2 OP CODE |
|---|---|---|
| MOV | 1 1 1 0 0 0 0 0 0 0 0 1 | 1 0 1 0 0 0 0 0 0 0 0 0 |
| CMP | 1 0 1 0 0 0 0 0 0 0 0 1 | 1 1 1 0 0 0 0 0 0 0 0 0 |
| ADD | 1 1 0 0 0 0 0 0 0 0 0 1 | 1 1 0 0 0 0 0 0 0 0 0 0 |
| SUB | 1 1 0 0 1 0 0 0 0 0 0 1 | 1 0 1 1 1 0 0 0 0 0 0 1 |
| BEQ | 1 0 1 1 0 0 0 0 0 0 0 1 | 1 1 1 1 0 0 0 0 0 0 0 1 |
| ⋮ | ⋮ | ⋮ | columns labeled 31, 32, 33

FIG. 6

| PROGRAM | MACHINE-LANGUAGE INSTRUCTION SEQUENCES |
|---|---|
| MOV R0, R1 | 1 0 1 0 0 0 0 0 0 0 0 0    R0, R1 |
| CMP R1, R2 | 1 1 1 0 0 0 0 0 0 0 0 0    R1, R2 |
| BEQ L | 1 1 1 1 0 0 0 0 0 0 0 1    disp |
| MOV R2, R3 | 1 1 1 0 0 0 0 0 0 0 0 1    R2, R3 |
| ADD R3, R4 | 1 1 0 0 0 0 0 0 0 0 0 1    R3, R4 |
| L: SUB R4, R5 | 1 1 0 0 1 0 0 0 0 0 0 1    R4, R5 |

FIG. 10

| PROGRAM | MACHINE-LANGUAGE INSTRUCTION SEQUENCES | |
|---|---|---|
| MOV R0, R1 | 1 0 1 0 0 0 0 0 0 0 0 0 | R0, R1 |
| CMP R1, R2 | 1 1 1 0 0 0 0 0 0 0 0 0 | R1, R2 |
| BEQ L | 1 1 1 1 0 0 0 0 0 0 0 1 | disp |
| MOV R2, R3 | 1 1 1 0 0 0 0 0 0 0 0 1 | R2, R3 |
| ADD R3, R4 | 1 1 0 0 0 0 0 0 0 0 0 1 | R3, R4 |
| L: SUB R4, R5 | 1 0 1 1 1 0 0 0 0 0 0 1 | R4, R5 |

| ID NO. | TYPE-1 OP CODE | TYPE-2 OP CODE | OPERATION |
|---|---|---|---|
| 1 | 111000000001 | 101000000000 | MOV |
| 2 | 101000000001 | 111000000000 | CMP |
| 3 | 101100000001 | 111100000001 | BEQ |
| 4 | 111000000001 | 101000000000 | MOV |
| 5 | 110000000001 | 110000000000 | ADD |
| 6 | 110010000001 | 101110000001 | SUB |

FIG. 13

| | CANDIDATE 1 | CANDIDATE 2 | CANDIDATE 3 | CANDIDATE 4 | ... | CANDIDATE i |
|---|---|---|---|---|---|---|
| 1 | 1 | 1 | 1 | 1 | | |
| 2 | 1 | 1 | 1 | 1 | | |
| 3 | 1 | 1 | 1 | 1 | | |
| 4 | 1 | 1 | 1 | 1 | | |
| 5 | 1 | 1 | 2 | 2 | | |
| 6 | 1 | 2 | 1 | 2 | | |

MOV    R0, R1

CMP    R1, R2

MOV    R2, R3

ADD    R3, R4

SUB    R4, R0

FIG. 21

| OPERAND CODES HAVING BEEN REPLACED (2201) | OPERAND CODES HAVING NOT BEEN REPLACED (2202) |
|---|---|
| 0 0 0 0 0 0 0 0 0 1 | 0 0 0 0 0 0 0 0 0 1 |
| 0 0 0 1 0 0 0 0 0 1 | 0 0 0 0 1 0 0 0 1 0 |
| 0 0 0 1 0 0 0 0 1 1 | 0 0 0 1 0 0 0 0 1 1 |
| 0 0 1 0 0 0 0 0 1 1 | 0 0 0 1 1 0 0 1 0 0 |
| 0 0 1 0 0 0 0 0 0 0 | 0 0 1 0 0 0 0 0 0 0 |

PROGRAM CONVERSION APPARATUS, PROCESSOR, AND RECORD MEDIUM

BACKGROUND OF THE INVENTION (1) Field of the Invention

The present invention relates to a program conversion apparatus which converts a source program into a machine-language sequence, and relates to a processor which executes the machine-language sequence output from the program conversion apparatus.

(2) Description of Related Art

A program conversion apparatus has a table showing relationships between (a) instructions written in a programming language such as a high-level language and an assembly language and (b) machine-language instructions. When a source program is input to the program conversion apparatus, the program conversion apparatus converts the source program into machine-language instruction sequences using the table.

A processor stores the machine-language instruction sequences in a ROM, reads out the machine-language instruction sequences sequentially in units of machine-language instructions from the ROM to an instruction register, decodes the instructions, and allow the components such as an ALU and a register to operate in accordance with the decoding results.

Buses contained in the processor are each composed of a plurality of signal lines. Power is consumed when a bit value passing through a signal line changes from 0 to 1 or from 1 to 0. Each signal line corresponds to one digit of the machine-language instructions. That means the more bit changes are included in the machine-language instruction sequences, the more power is consumed, where the bit change is a change between successive values in the same digit between two successive machine-language instructions. Accordingly, there has been a desire to reduce the number of bit changes in the machine-language instruction sequences to reduce the power consumption.

SUMMARY OF THE INVENTION

It is therefore an object of the present invention to provide a program conversion apparatus which converts a source program into machine-language instruction sequences having reduced number of bit changes, where the bit change is a change between values in the same digit between two successive machine-language instructions, a record medium recording a program for achieving the conversion, a processor for executing the converted machine-language instruction sequences, and a record medium recording a program for achieving the execution.

The above object is fulfilled by a program conversion apparatus for converting a source program into machine-language instructions to be executed by a processor, the processor reading out the machine-language instructions sequentially from a memory unit via a bus, the program conversion apparatus comprising:

a program storage means for storing the source program which includes a plurality of instructions, each instruction including one or more types of components; a machine-language storage means for storing a plurality of sets of two or more types of machine-language codes which correspond to a plurality of components of a predetermined type included in the plurality of instructions, the two or more types of machine-language codes in each set having different bit patterns; and a conversion means for converting the plurality of instructions stored in the program storage means into the machine-language instructions, wherein the conversion means converts each of the plurality of predetermined-type components selectively into one of the two or more types of machine-language codes so that changes in logical states of signal lines composing the bus are fewest for the machine-language instructions.

With the above construction, the program conversion apparatus converts a source program into machine-language instruction sequences that render the power consumption of a processor small. The machine-language instruction sequences have reduced number of bit changes, where the bit change is a change between values in the same digit between two successive machine-language instructions. This enables the processor to execute the machine-language instructions with less power consumption since when these instructions pass through the bus between the ROM and the instruction register bus, less power is consumed due to less bit changes (power consumption) in each signal line constituting the bus.

In the above program conversion apparatus, each of the plurality of predetermined-type components may indicate an operation, the machine-language storage means stores a plurality of sets of two types of operation codes corresponding to the plurality of predetermined-type components indicating operations, the two types of operation codes in each set having different bit patterns, and the conversion means converts each of the plurality of predetermined-type components selectively into one of the two types of operation codes so that changes in logical states of signal lines composing the bus are fewest for the machine-language instructions.

With the above construction, the program conversion apparatus converts a source program into machine-language instruction sequences that render the power consumption of a processor small. The machine-language instruction sequences have reduced number of bit changes in terms of the operation codes. This enables the processor to execute the machine-language instructions with less power consumption since when these instructions pass through the bus between the ROM and the instruction register bus, less power is consumed due to less bit changes (power consumption) in each signal line constituting the bus.

In the above program conversion apparatus, each digit of the machine-language instructions may correspond to one of the signal lines, the conversion means converts the plurality of instructions included in the source program one by one, and includes: a reading means for reading out the plurality of sets of two types of operation codes corresponding to the plurality of predetermined-type components; a calculation means for comparing, for each of the two types of operation codes in a set read by the reading means, a bit pattern of the operation code with bits in a corresponding position in an immediately preceding machine language instruction and calculating a number of bits in the bit pattern having different values from the immediately preceding machine language instruction; a judging means for judging which of the two types of operation code has a bit pattern with a lower number of different bit values; and a selecting means for selecting an operation code judged to have the bit pattern with the lower number of different bit values.

With the above construction, the program conversion apparatus converts a plurality of certain components of a source program into operation codes having short Hamming distances from the preceding operation codes, sequentially starting from the first component of the program. As a result, the machine-language instruction sequences converted from the source program have less bit changes in terms of the operation codes. This enables the processor to execute the machine-language instructions with less power consumption for the same reason stated earlier. It should be noted here that the Hamming distance is the sum of bit changes between two bit patterns having the same length, the bit change being a change between two values in the same digit. For example, between bit patterns "10011" and "10110", there are bit changes in the third and fifth digits from left. In this case, the Hamming distance is 2.

In the above program conversion apparatus, the calculation means may include: an exclusive OR means for performing an exclusive OR for each digit between each of the two types of operation code in a set read by the reading means and the bits in the corresponding position in the immediately preceding machine language instruction; and an addition means for adding up each result of the exclusive OR means to obtain a sum for each of the two types of operation code, the sums being used as the number of bits in the bit pattern having different values from the immediately preceding machine language instruction.

With the above construction, it is possible to obtain the Hamming distance between two operation codes simply by calculating an exclusive OR for each digit in each of the two combinations of the operation codes and adding up the results for each code.

In the above program conversion apparatus, bit patterns that render the sum of the number of digit-value changes lower than a threshold value may be assigned to machine-language codes in the machine-language storage means that correspond to two predetermined components which have a high probability of being included in two successive instructions in the source program.

With the above construction, the number of digit-value changes in the entire machine-language instructions is reduced.

In the above program conversion apparatus, each digit of the machine-language instructions may correspond to one of the signal lines, the conversion means includes: a reading means for reading out the plurality of sets of two types of operation codes corresponding to the plurality of predetermined-type components from the machine-language storage means; a candidate generating means for generating a plurality of candidates which are different combinations of operation codes each of which is selected from each set of the two types of operation code; and a selection means for selecting one of the plurality of candidates that renders changes in values of the machine-language instructions passing through signal lines of the bus the smallest.

With the above construction, the conversion means can convert the source program into machine-language instructions having less digit-value changes by selecting one among a plurality of candidates.

In the above program conversion apparatus, the selection means may include: a calculation means for calculating the number of digit-value changes between each two successive operation codes in each of the plurality of candidates, and obtains a sum of the number of digit-value changes for each of the plurality of candidates; a judging means for judging which sum is the lowest; and a selection unit for selecting one of the plurality of candidates that corresponds to the sum judged by the judging means as the lowest.

With the above construction, the selection means can select one candidate that has the least number of digit-value changes by calculating the Hamming distance between each two successive operation codes and comparing the calculated Hamming distances.

In the above program conversion apparatus, each of the plurality of predetermined-type components may indicate a resource, the machine-language storage means stores a plurality of sets of two types of operand codes corresponding to the plurality of predetermined-type components indicating resources, the two types of operand codes in each set having different bit patterns, and the conversion means converts each of the plurality of predetermined-type components selectively into one of the two types of operand codes so that changes in logical states of signal lines composing the bus are fewest for the machine-language instructions.

With the above construction, the program conversion apparatus converts a source program into machine-language instruction sequences that render the power consumption of a processor small. The machine-language instruction sequences have reduced number of bit changes in terms of the operand codes. This enables the processor to execute the machine-language instructions with less power consumption since when these instructions pass through the bus between the ROM and the instruction register bus, less power is consumed due to less bit changes (power consumption) in each signal line constituting the bus.

In the above program conversion apparatus, each digit of the machine-language instructions may correspond to one of the signal lines, the conversion means converts the plurality of instructions included in the source program one by one, and includes: a reading means for reading out the plurality of sets of two types of operand codes corresponding to the plurality of predetermined-type components; a calculation means for comparing, for each of the two types of operand codes in a set read by the reading means, a bit pattern of the operand code with bits in a corresponding position in an immediately preceding machine language instruction and calculating a number of bits in the bit pattern having different values from the immediately preceding machine language instruction; a judging means for judging which of the two types of operand code has a bit pattern with a lower number of different bit values; and a selecting means for selecting an operand code judged to have the bit pattern with the lower number of different bit values.

With the above construction, the program conversion apparatus converts a plurality of certain components of a source program into operand codes having short Hamming distances from the preceding operand codes, sequentially starting from the first component of the program. As a result, the machine-language instruction sequences converted from the source program have less it changes in terms of the operand codes. This enables the processor to execute the machine-language instructions with less power consumption for the same reason stated earlier.

In the above program conversion apparatus, the calculation means may include: an exclusive OR means for performing an exclusive OR for each digit between each of the two types of operand code in a set read by the reading means and the bits in the corresponding position in the immediately preceding machine language instruction; and an addition means for adding up each result of the exclusive OR means to obtain a sum for each of the two types of operand code, the sums being used as the number of bits in the bit pattern having different values from the immediately preceding machine language instruction.

With the above construction, it is possible to obtain the Hamming distance between two operand codes simply by calculating an exclusive OR for each digit in each of the two combinations of the operand codes and adding up the results for each code.

In the above program conversion apparatus, each digit of the machine-language instructions may correspond to one of the signal lines, the conversion means includes: a reading means for reading out the plurality of sets of two types of operand codes corresponding to the plurality of predetermined-type components from the machine-language storage means; a candidate generating means for generating a plurality of candidates which are different combinations of operand codes each of which is selected from each set of the two types of operand code; and a selection means for selecting one of the plurality of candidates that renders changes in values of the machine-language instructions passing through signal lines of the bus the lowest.

With the above construction, the conversion means can convert the source program into machine-language instructions having less digit-value changes by selecting one among a plurality of candidates.

In the above program conversion apparatus, the selection means may include: a calculation means for calculating the number of digit-value changes between each two successive operand codes in each of the plurality of candidates, and obtains a sum of the number of digit-value changes for each of the plurality of candidates; a judging means for judging which sum is the lowest; and a selection unit for selecting one of the plurality of candidates that corresponds to the sum judged by the judging means as the lowest.

With the above construction, the selection means can select one candidate that has the least number of digit-value changes by calculating the Hamming distance between each two successive operand codes and comparing the calculated Hamming distances.

In the above program conversion apparatus, the conversion means may further include: a setting means for inserting an identification bit into each machine-language instruction converted by the conversion means, the identification bit indicating which of the two types of machine-language codes has been selected.

With the above construction, the processor that executes the machine-language instructions can identify the type of each instruction by referring to the identification bit.

The above object is also fulfilled by a program conversion apparatus for converting a source program into machine-language instructions to be executed by a processor, the processor reading out the machine-language instructions sequentially from a memory unit via a bus, the program conversion apparatus comprising: a program storage means for storing the source program which includes a plurality of instructions; a conversion means for converting the plurality of instructions stored in the program storage means into the machine-language instructions; and a replacing means for, every two times the conversion means outputs a machine-language instruction including both a source field and a destination field, replacing contents of the source field and the destination field with each other.

With the above construction, when two successive machine-language instructions are, for example, "ADD R1,R2" (add up values stored in R1 and R2 and store the result into R2), and "ADD R2,R3" (add up values stored in R2 and R3 and store the result into R3), the replacing means replaces R2 and R3 of the second instruction with each other to "ADD R3,R2". Alternatively, the replacing means replaces R1 and R2 of the first instruction with each other to "ADD R2,R1". After either of these replacements, R2 with the same bit pattern is placed at the same digit position in the two instructions, resulting in the Hamming distance 0 between the two instructions in terms of the R2 section.

In the above program conversion apparatus, the conversion means may convert the plurality of instructions into the machine-language instructions having a fixed length, and the replacing means replaces contents of the source field and the destination field with each other every two times the replacing means detects a machine-language instruction having a register number in at least one of the source field and the destination field.

With the above construction, the same effect as above can be obtained.

In the above program conversion apparatus, each machine-language instruction may have a bit field, and the replacing means inserts a bit value into the bit field of a machine-language instruction when the replacing means has replaced contents of the source field and the destination field of this machine-language instruction.

With the above construction, the processor that executes the machine-language instructions can determine whether the replacement has been performed by referring to the bit.

In the above program conversion apparatus, the replacing means may replace contents of the source field and the destination field with each other when an alternate machine-language instruction output from the conversion means has a register number in at least one of the source field and the destination field.

With the above construction, two successive machine-language instructions each have a section indicating a register placed at the same digit, resulting in the Hamming distance 0 at this section.

The above object is also fulfilled by a processor comprising: a reading means for reading a plurality of machine-language instructions sequentially from a memory via a bus, each of the plurality of machine-language instructions having either type-1 bit pattern or type-2 bit pattern, and has an identification bit which indicates either the type-1 bit pattern or the type-2 bit pattern; an identification means for identifying a bit pattern of each of the plurality of machine-language instructions read out by the reading means by referring to the identification bit; a first decoding means for decoding machine-language instructions having type-1 bit patterns and outputting decoding results; and a second decoding means for decoding machine-language instructions having type-2 bit patterns and outputting decoding results, wherein the first decoding means and the second decoding means output the same decoding result for the same machine-language instruction whether a bit patter thereof is type-1 or type-2.

With the above construction, the processor can execute the machine-language instructions that each have two bit patterns. By selectively combining the two bit patterns, the processor can execute the machine-language instructions with less power consumption since when these instructions pass through the bus between the ROM and the instruction register bus, less power is consumed due to less bit changes (power consumption) in each signal line constituting the bus.

In the above processor, the type-1 bit pattern and the type-2 bit pattern may be different from each other in terms of a bit pattern of an operation code included in each of the plurality of machine-language instructions, and the processor further comprises: an operand decoding unit for decoding operand codes of the plurality of machine-language instructions, wherein the first decoding means decodes operation codes of machine-language instructions having the type-1 bit pattern, and the second decoding means decodes operation codes of machine-language instructions having the type-2 bit pattern.

With the above construction, the processor can execute the machine-language instructions that each have two bit patterns in terms of the operation code section.

In the above processor, the type-1 bit pattern and the type-2 bit pattern may be different from each other in terms of a bit pattern of an operand code included in each of the plurality of machine-language instructions, each operand code corresponding to two different bit patterns and indicating the same register, and the processor further comprises: an operation decoding unit for decoding operation codes of the plurality of machine-language instructions, wherein the first decoding means decodes operand codes of machine-language instructions having the type-1 bit pattern, and the second decoding means decodes operand codes of machine-language instructions having the type-2 bit pattern.

With the above construction, the processor can execute the machine-language instructions that each have two bit patterns in terms of the operand code section.

In the above processor, each machine-language instruction may be classified into an order-1 type and an order-2 type regardless of a bit pattern thereof, the order-1 type indicating an order of a plurality of operand codes included in each machine-language instruction, and the order-2 type indicating another order of the plurality of operand codes, each machine-language instruction having a classification bit indicating the order-1 type or the order-2 type, and the operand decoding unit includes: a classification unit for classifying each machine-language instruction into the order-1 type or the order-2 type by referring to the classification bit; a rearranging unit for rearranging the plurality of operand codes of machine-language instructions of the order-2 type to the order-1 type; and a decoding unit for decoding operand codes of machine-language instructions of the order-1 type and operand codes rearranged by the rearranging unit from the order-2 type to the order-1 type.

With the above construction, the processor identifies the order type (order-1 type or order-2 type) of the operand codes by referring to the classification bit, and rearranges the operand codes of the order-2 type to the order-1 type to decode the machine-language instructions.

The above object is also fulfilled by a processor comprising: a reading means for reading a plurality of machine-language instructions sequentially from a memory via a bus, each of the plurality of machine-language instructions has a plurality of operands, and is classified into one of an order-1 type machine-language instruction and an order-2 type machine-language instruction, the order-1 type and order-2 type machine-language instructions having different orders of the plurality of operands; an identification means for identifying each of the plurality of machine-language instructions read out by the reading means as the order-1 type or the order-2 type machine-language instruction; a first decoding means for decoding order-1 type machine-language instructions and outputting decoding results; and a second decoding means for decoding order-2 type machine-language instructions and outputting decoding results.

With the above construction, when a machine-language instruction has, for example, a fixed length of 32 bits, the processor specifies the address of the next machine-language instruction by incrementing the program counter by four. In this case, the identification means can easily identify the type of each machine-language instruction by performing the simple judgement on whether the third bit from the least significant bit in the program counter is 0.

In the above processor, the second decoding means may include: a rearranging unit for rearranging orders of the plurality of operand codes of order-2 type machine-language instructions, decoding the rearranged operand codes, and outputting the same decoding results as the first decoding means.

With the above construction, the processor reads out each machine-language instruction with shorter Hamming distance from the ROM to the instruction register, and decodes it after restoring the order of the operands if the operands have been replaced with each other. This reduces the power consumption in the bus when such an instruction passes through the bus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows an example of a program stored in the program storage unit 11;

FIG. 4 shows instructions included in the program shown in FIG. 2;

FIG. 5 shows specific examples of the relationships between type-1 op codes and type-2 op codes;

FIG. 6 shows examples of machine-language instruction sequences stored in the machine-language instruction storage unit 14;

FIG. 10 shows machine-language instruction sequences converted by the program conversion apparatus 10;

FIG. 13 shows combinations of the type-1 and type-2 op codes, generated by the candidate generating unit 253;

FIG. 21 shows bit patterns of machine-language operands of machine-language instruction sequences stored in the machine-language instruction storage unit 14 (column 2201) and bit patterns of machine-language operands for which replacement of the operand codes has not been performed (column 2202);

DESCRIPTION OF THE PREFERRED EMBODIMENTS

Figure 1:
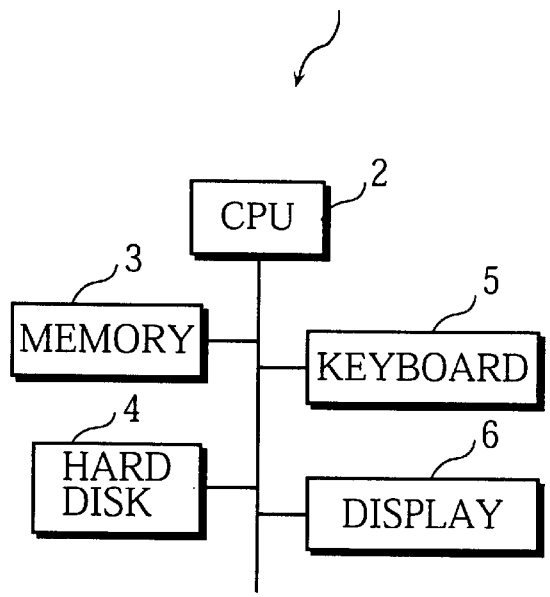
FIG. 1 shows the hardware construction of a program conversion apparatus in Embodiment 1.

The following is a description of the present invention through specific embodiments thereof by way of referring to the drawings.

Embodiment 1
Program Conversion Apparatus

The program conversion apparatus in Embodiment 1 will be described with reference to the drawings.
Construction of Program Conversion Apparatus FIG. 1 shows the hardware construction of a program conversion apparatus 10 in Embodiment 1.

As shown in FIG. 1, the program conversion apparatus 10 is a general-purpose computer including a CPU 2, a memory 3, a hard disk 4, a keyboard 5, and a display 6. The memory 3 stores a software program. The CPU executes the program to achieve the functions shown in FIG. 2.

Figure 2:
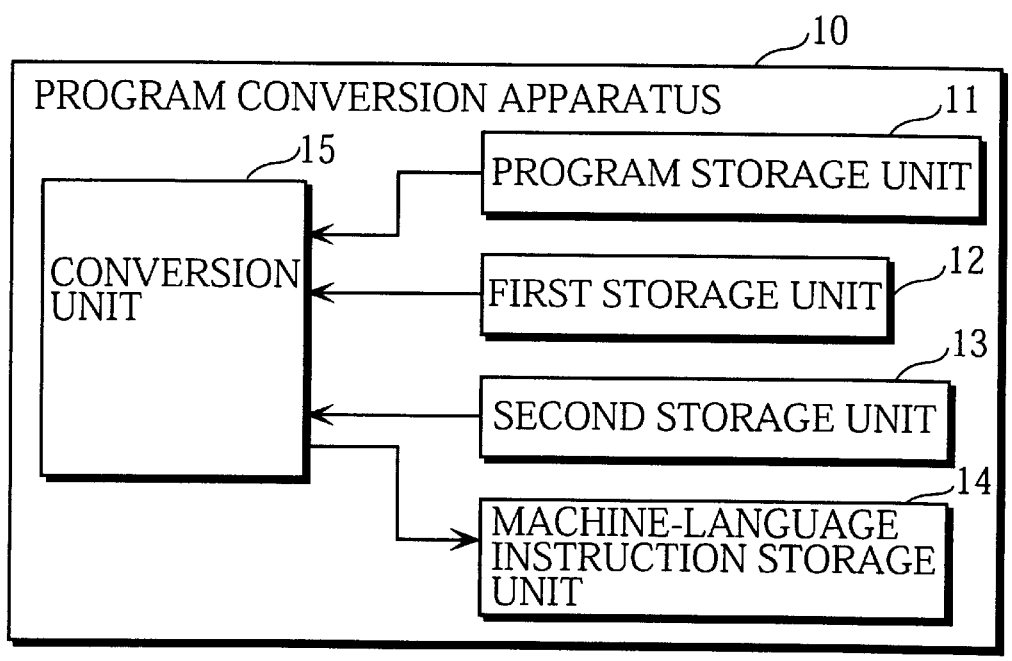
FIG. 2 is a functional block diagram showing the construction of the program conversion apparatus 10 in terms of the functions.

FIG. 2 is a functional block diagram showing the construction of the program conversion apparatus 10 in terms of the functions.

In FIG. 2, the program conversion apparatus 10 includes a program storage unit 11, a first storage unit 12, a second storage unit 13, a machine-language instruction storage unit 14, and a conversion unit 15.

The program storage unit 11 stores a program input to the program conversion apparatus 10 from outside. FIG. 3 shows an example of a program stored in the program storage unit 11.

As shown in FIG. 3, the program is written in an assembly language. The program includes instructions which are each composed of one operation and two operands.

Here, the operations indicate operations of the CPU 2. In FIG. 3, MOV and CMP are operations.

Operands indicate numeral values or registers dealt with in operations of the CPU 2. In FIG. 3, Rn (n=0, 1, 2, 3, . . . ) is an operand indicating a register. In each instruction including two operands, the first operand is called a source operand and the second operand is called a destination operand. For example, in instruction "MOV R0,R1", MOV is an operation, R0 a source operand, and R1 a destination operand. This instruction indicates an operation of transferring a value from register R0 to register R1.

FIG. 4 shows operations indicated by each instruction in the program.

The first storage unit 12 stores operations with corresponding machine-language operation codes. Hereinafter, the machine-language operation codes are referred to as op codes.

The second storage unit 13 stores the same operations as the first storage unit 12, and also stores corresponding op codes which have different bit patterns from those of the op codes in the first storage unit 12.

Hereinafter, the op codes stored in the first storage unit 12 are referred to as type-1 op codes, and the op codes stored in the second storage unit 13 are referred to as type-2 op codes. Each one of the type-1 and type-2 op codes is composed of 12 bits.

FIG. 5 shows specific relationships between the type-1 op codes and the type-2 op codes.

In FIG. 5, the column 31 shows operations, the column 32 shows type-1 op codes, and the column 33 shows type-2 op codes. These elements in the same row correspond to each other. As understood from FIG. 5, two type-1 and type-2 op codes corresponding to an operation have different bit patterns. The first storage unit 12 stores the operations shown in the column 31 and the type-1 op codes shown in the column 32 by corresponding the operations to the type-1 op codes. The second storage unit 13 stores the operations shown in the column 31 and the type-2 op codes shown in the column 33 by corresponding the operations to the type-2 op codes.

The machine-language instruction storage unit 14 accumulates and stores the machine-language instruction sequences output from the conversion unit 15.

FIG. 6 shows examples of machine-language instruction sequences stored in the machine-language instruction storage unit 14. These examples correspond to the instructions contained in the program shown in FIG. 3. In FIG. 6, the operands in the program on the left-hand column are used as the operand codes in the corresponding machine-language instruction sequences. In reality, however, each operand code is a sequence of, for example, bits. R0 and R1 in "R0,R1" in reality therefore are, for example, "00000" and "00001", respectively.

As shown in FIG. 6, each machine-language instruction sequence contains a type-1 or type-2 op code alternatively to shorten the Hamming distance between successive machine-language instructions.

The conversion unit 15 reads out instructions one at a time starting from the first instruction of the program stored in the program storage unit 11, converts the read-out instructions, and stores the converted instructions into the machine-language instruction storage unit .14.

More specifically, the conversion unit 15 separately performs the conversion from an operation to an op code and the conversion from an operand to an operand code. When performing the conversion from an operation to an op code, the conversion unit 15 first reads out the type-1 and type-2 op codes corresponding to the conversion-target operation respectively from the first storage unit 12 and the second storage unit 13, then selects one out of the read-out op codes which renders the Hamming distance from the preceding instruction shorter.
Detailed Construction of Conversion Unit 15

Figure 7:
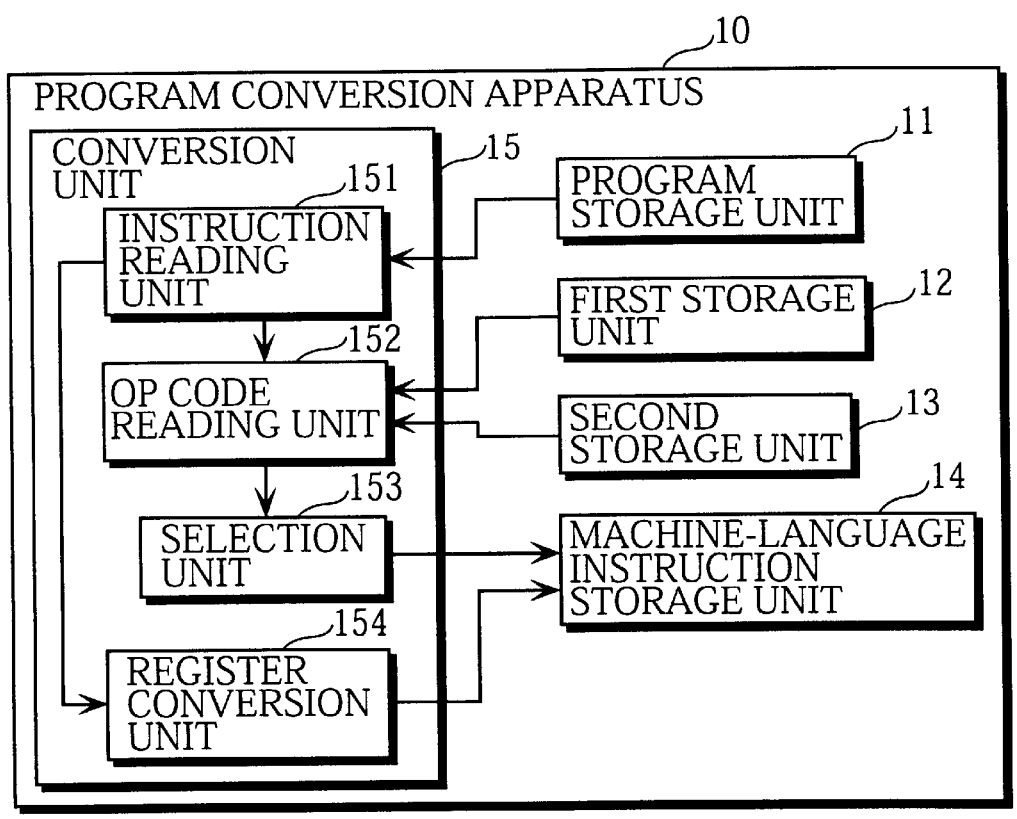
FIG. 7 is a block diagram showing a detailed construction of the conversion unit 15.

FIG. 7 is a block diagram showing a detailed construction of the conversion unit 15.

As shown in FIG. 7, the conversion unit 15 includes an instruction reading unit 151, an op code reading unit 152, a selection unit 153, and a register conversion unit 154.

The instruction reading unit 151 reads out instructions one at a time from the program storage unit 11, outputs the operations contained in the read-out instructions to the op code reading unit 152, and outputs the operands contained in the read-out instructions to the register conversion unit 154.

When the program storage unit 11 currently stores, for example, the program shown in FIG. 3, the instruction reading unit 151 first reads out "MOV R0,R1", then "CMP R1,R2", and so on in the shown order. Paralleling the sequential read-out of the instructions, the instruction reading unit 151 outputs the operation "MOV" and the operands "R0,R1" contained in the read-out "MOV R0,R1" to the op code reading unit 152 and the register conversion unit 154, respectively. Then, similarly, the instruction reading unit 151 outputs the operation "CMP" and the operands "R1,R2"

contained in the read-out "CMP R1,R2" to the op code reading unit 152 and the register conversion unit 154, respectively.

The op code reading unit 152 reads out the type-1 and type-2 op codes corresponding to the operation read out by the instruction reading unit 151 respectively from the first storage unit 12 and the second storage unit 13, then outputs the read-out op codes to the selection unit 153.

For example, when the instruction reading unit 151 outputs the operation "MOV", the op code reading unit 152 reads out the type-1 op code "111000000001" from the first storage unit 12 and reads out the type-2 op code "101000000000" from the second storage unit 13 (refer to FIG. 5), and outputs these op codes to the selection unit 153.

The selection unit 153 selects an op code, which renders the Hamming distance from the preceding instruction shorter, out of the type-1 op code and the type-2 op code read out by the op code reading unit 152, and stores the selected op code into the machine-language instruction storage unit 14.

It should be noted here that the selection unit 153 always selects the type-2 op code in correspondence to the operation of the first instruction in the program. Note also that the selection unit 153 always selects the type-2 op code when the type-1 op code and the type-2 op code render the Hamming distance the same. In the above two cases, the selection unit 153 may always select the type-1 op code instead of the type-2 op code.

The register conversion unit 154, when having received an operand or a label from the instruction reading unit 151, converts the received operand or label to a binary number indicating a register number or corresponding to the label. The register conversion unit 154 then stores the converted binary operand code or label into the machine-language instruction storage unit 14 by corresponding it to the op code having been stored therein by the selection unit 153.

Detailed Construction of Selection Unit 153

Figure 8:
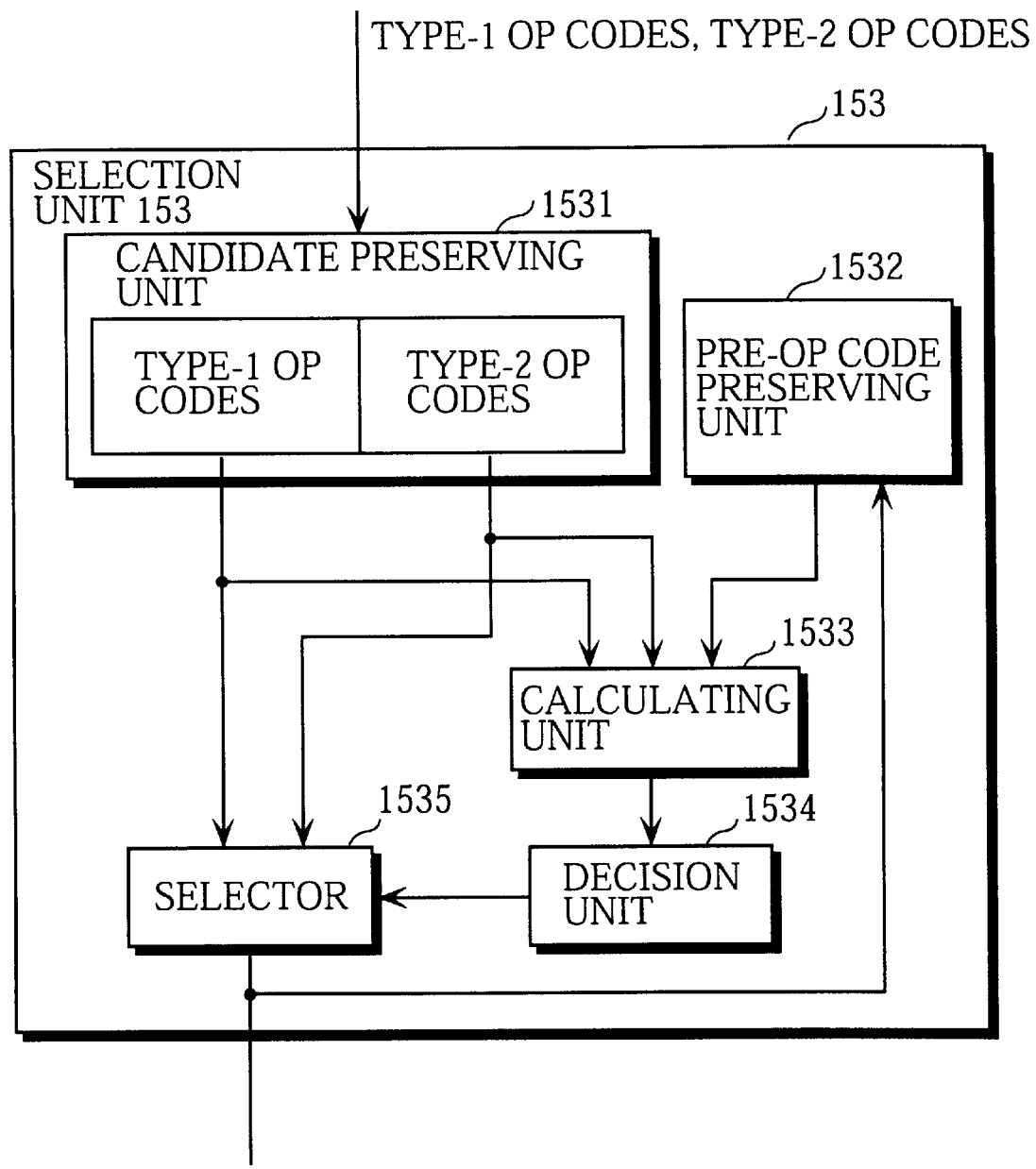
FIG. 8 shows a detailed construction of the selection unit 153.

FIG. 8 shows a detailed construction of the selection unit 153.

The selection unit 153 includes a candidate preserving unit 1531, a pre-op code preserving unit 1532, a calculating unit 1533, a decision unit 1534, and a selector 1535.

The candidate preserving unit 1531 has a buffer that can store two op codes, and stores in it the type-1 op code and the type-2 op code input from the op code reading unit 152. The candidate preserving unit 1531 updates the buffer each time the op code reading unit 152 sends new type-1 and type-2 op codes by overwriting the old op codes with the new ones.

The pre-op code preserving unit 1532 has a buffer that can store one op code, and stores in it one code sent from the candidate preserving unit 1531 via the selector 1535. The pre-op code preserving unit 1532 updates the buffer each time the candidate preserving unit 1531 sends a new op code by overwriting the old op code with the new one. The op code preserved by the pre-op code preserving unit 1532 corresponds to an instruction that precedes the instruction corresponding to the type-1 and type-2 op codes preserved by the candidate preserving unit 1531.

Hereinafter, the op code preserved by the pre-op code preserving unit 1532, or the op code having been selected immediately before the current selection candidates, the type-1 and type-2 op codes preserved by the candidate preserving unit 1531, is referred to as pre-op code.

The calculating unit 1533 calculates d1 which is the Hamming distance between the type-1 op code preserved by the candidate preserving unit 1531 and the pre-op code, calculates d2 which is the Hamming distance between the type-2 op code preserved by the candidate preserving unit 1531 and the pre-op code, and outputs the obtained Hamming distances d1 and d2 to the decision unit 1534. The calculating unit 1533 calculates the Hamming distance between two op codes as follows. The calculating unit 1533 first calculates the exclusive-OR for two values of the same digit in the two op code for each digit of the op code. Here, when the two values are the same, the result of the exclusive-OR is 0; and when the two values are different from each other, the result of the exclusive-OR is 1. The calculating unit 1533 then calculates the sum of the results of the exclusive-ORs for each digit of the op code. The sum shows the number of digits having different values in the two op codes. The number is used as the Hamming distance.

The decision unit 1534 compares the Hamming distance d1 with the Hamming distance d2 to decide which is shorter. The decision unit 1534 converts the decision result to a selection signal and outputs the selection signal to the selector 1535. The selection signal is 0 when the Hamming distance d1 is shorter than d2, and 1 when the Hamming distance d2 is shorter than d1.

It should be noted here that the decision unit 1534 outputs 1 as the selection signal when the Hamming distances d1 and d2 are the same or when the type-1 and type-2 op codes as the candidates for selection correspond to the first instruction in the program. In the above two case, the decision unit 1534 may always output 0 as the selection signal instead of 1.

The selector 1535 selects one of the type-1 and type-2 op codes preserved by the candidate preserving unit 1531 according to the selection signal output from the decision unit 1534, and outputs the selected op code to the machine-language instruction storage unit 14 and the pre-op code preserving unit 1532. More specifically, the selector 1535 selects the type-1 op code when it receives 0 as the selection signal and selects the type-2 op code when it receives 1, and outputs the selected op code to the machine-language instruction storage unit 14 and the pre-op code preserving unit 1532.

As described above, the selection unit 153 selects one out of the type-1 and type-2 op codes that renders the Hamming distance between the op codes of the successive machine-language instructions shorter, and stores the selected op code into the machine-language instruction storage unit 14. As this process is repeated, the machine-language instruction storage unit 14 accumulates the op codes received from the selector, or the op codes which render the Hamming distances between the op codes of the successive machine-language instructions.

Operation of Program Conversion Apparatus 10

The operation of the program conversion apparatus 10 having the above construction will be described.

Figure 9:
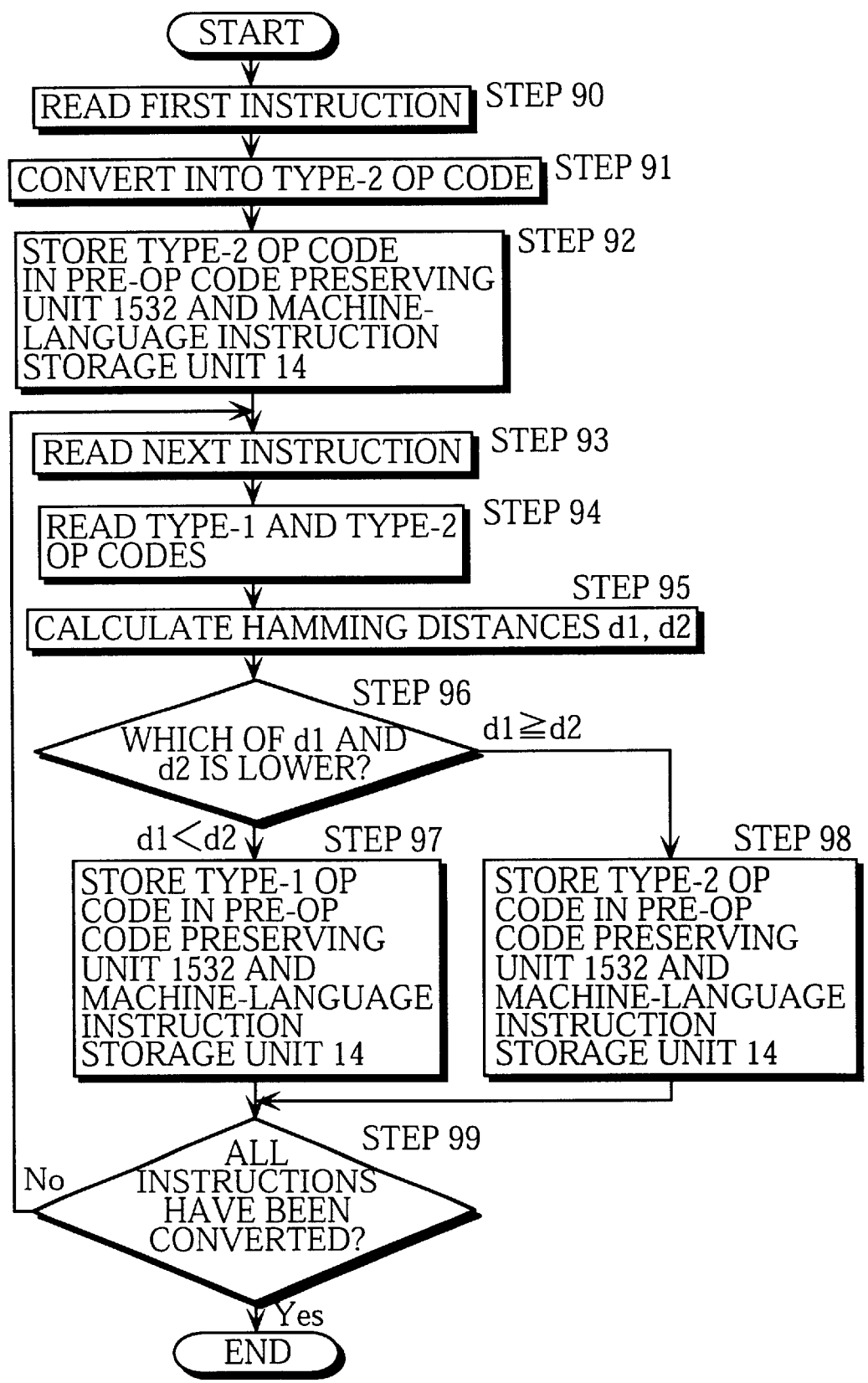
FIG. 9 is a flowchart showing the operation procedure of the program conversion apparatus 10.

FIG. 9 is a flowchart showing the operation procedure of the program conversion apparatus 10.

Now, the operation of the program conversion apparatus 10 in converting the program into machine-language instruction sequences will be described with reference to the flowchart.

The instruction reading unit 151 reads out "MOV R0,R1" being the first instruction in the program from the program storage unit 11 (step 90). The instruction reading unit 151 then outputs operation "MOV" to the op code reading unit 152, and outputs operands "R0,R1" to the register conversion unit 154. The register conversion unit 154 converts the received operands "R0,R1" into operand codes. The operation of the register conversion unit 154 is not detailed here since it is the same as conventional techniques.

The op code reading unit 152 reads out the type-1 and type-2 op codes corresponding to the operation "MOV" respectively from the first storage unit 12 and the second storage unit 13. The selection unit 153 converts the operation "MOV" into the type-2 op code "101000000000" since the operation corresponds to the first instruction (step 91).

The selected type-2 op code "101000000000" is output to the machine-language instruction storage unit 14 and the pre-op code preserving unit 1532 (step 92). Following this output, the register conversion unit 154 stores the converted operand code or label into the machine-language instruction storage unit 14.

The instruction reading unit 151 reads out the next instruction, "CMP R1,R2" from the program storage unit 11 (step 93). The instruction reading unit 151 then outputs operation "CMP" to the op code reading unit 152, and outputs operands "R1,R2" to the register conversion unit 154. The register conversion unit 154 converts the received operands "R1,R2" into operand codes.

The op code reading unit 152 reads out type-1 op code "101000000001" and type-2 op code "111000000000" corresponding to the operation "CMP" from the first storage unit 12 and the second storage unit 13, respectively, and outputs the read-out op codes to the selection unit 153 (step 94). These op codes are preserved by the candidate preserving unit 1531 in the selection unit 153.

The calculating unit 1533 of the selection unit 153 obtains the Hamming distance d1 by calculation from the type-1 op code "101000000001" (CMP) preserved by the candidate preserving unit 1531 and the pre-op code "101000000000" (MOV) preserved by the pre-op code preserving unit 1532. The calculating unit 1533 also obtains the Hamming distance d2 by calculation from the type-2 op code "111000000000" (CMP) and the pre-op code "101000000000" (MOV)(step 95). In this case, the Hamming distance d1 is 1, and the Hamming distance d2 is also 1.

The decision unit 1534 compares the Hamming distance d1 with the Hamming distance d2 to decide which is lower (step 96).

In this example, it is decided that d1=d2. The decision unit 1534 therefore outputs 1 as the selection signal to the selector 1535. Upon receiving 1 as the selection signal, the selector 1535 outputs type-2 op code "111000000000" (CMP) to the machine-language instruction storage unit 14 and the pre-op code preserving unit 1532 (step 98).

In steps 96 to 98, the type-1 op code is selected when d1<d2, and the type-2 op code is selected when $d1 \geq d2$ or when the corresponding instruction is the first instruction of the program, and the selected op code is output to the machine-language instruction storage unit 14 and the pre-op code preserving unit 1532.

The conversion unit 15 repeats the above-described procedure until the instruction reading unit 151 does not find any instruction to read. That is to say, conversion of each instruction into a machine-language instruction is repeated until all the instructions are converted into machine-language instructions (step 99).

As describe above, the program conversion apparatus 10 converts a program into machine-language instruction sequences so that the Hamming distance between op codes of the successive machine-language instructions is reduced. With such shorter Hamming distances, current changes on the instruction buses decrease when the processor reads the converted machine-language instructions from the program memory for execution. This provides an effect of reduction in the power consumption.

Embodiment 2
Program Conversion Apparatus

The program conversion apparatus in Embodiment 2 will be described.

Figure 11:
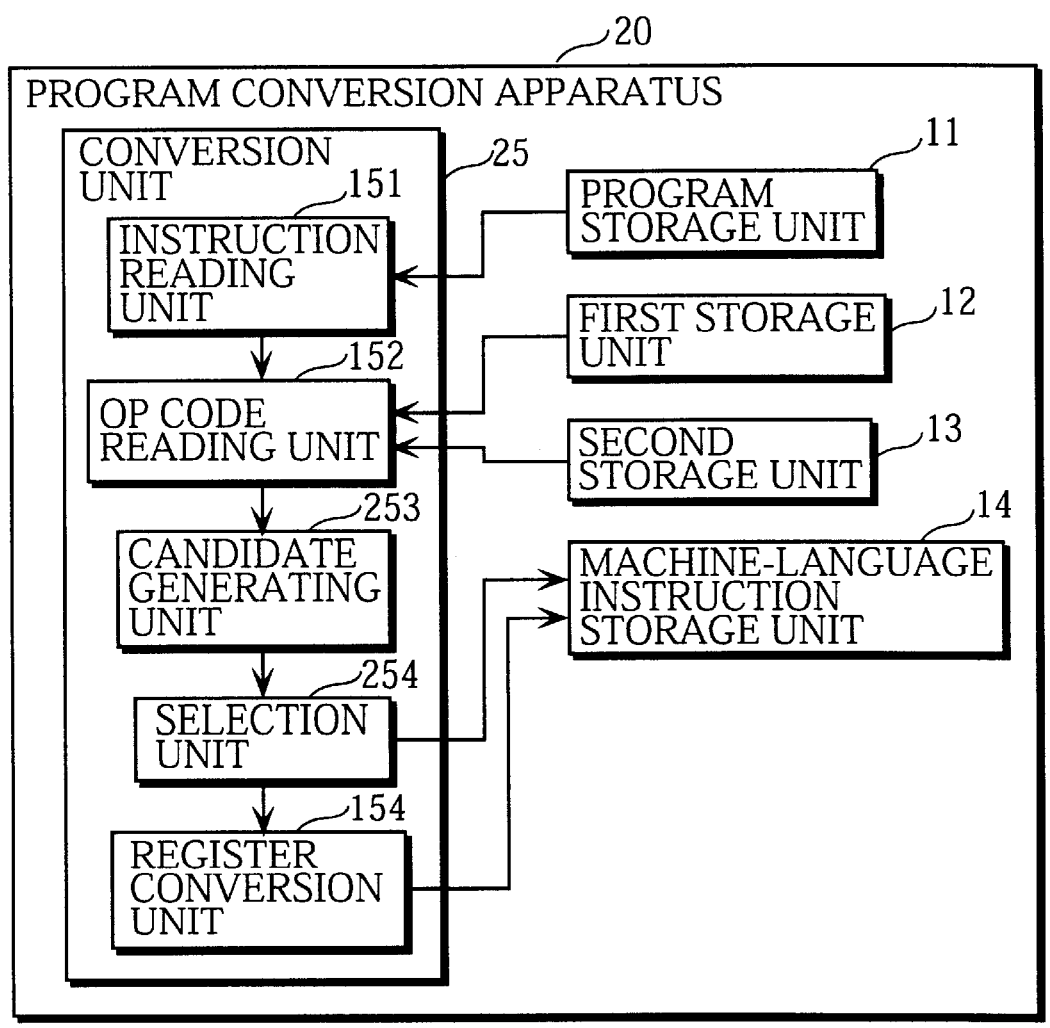
FIG. 11 is a functional block diagram showing the construction of a program conversion apparatus in Embodiment 2 in terms of the functions.

FIG. 11 is a functional block diagram showing the construction of a program conversion apparatus 20 in Embodiment 2 in terms of the functions.

In FIG. 11, the program conversion apparatus 20 includes a program storage unit 11, a first storage unit 12, a second storage unit 13, a machine-language instruction storage unit 14, and a conversion unit 25. The program conversion apparatus 20 includes the conversion unit 25 while the program conversion apparatus 10 includes the conversion unit 15.

The conversion unit 25 includes an instruction reading unit 151, an op code reading unit 152, a candidate generating unit 253, a selection unit 254, and a register conversion unit 154. The conversion unit 25 differs from the conversion unit 15 in Embodiment 1 in that it includes the candidate generating unit 253 and the selection unit 254. The following description will be focused on the difference between Embodiment 1 and Embodiment 2.

The candidate generating unit 253 stores the type-1 and type-2 op codes read out and output by the op code reading unit 152 into an internal memory of the candidate generating unit 253. Here, when either type-1 or type-2 op code is selected for each operation to generate machine-language instruction sequences, there are a plurality of possible combinations of type-1 and type-2 op codes for the entire machine-language instruction sequences. In the present embodiment, the possible combinations are regarded as candidates. The candidate generating unit 253 generates a plurality of such candidates alternatively.

Figure 12:
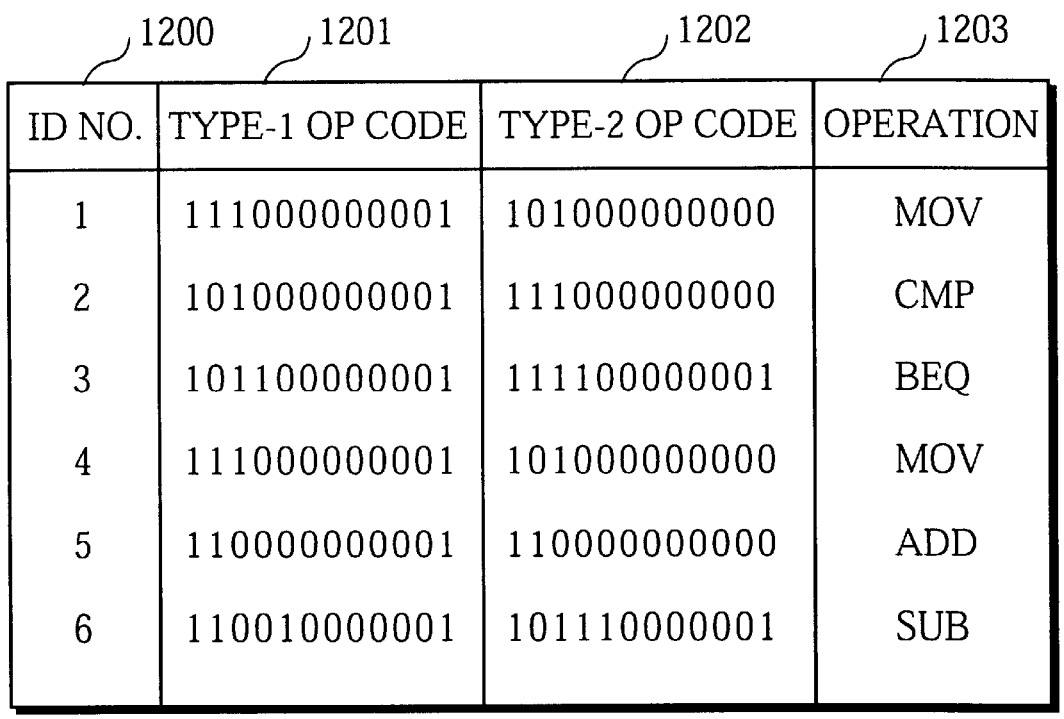
FIG. 12 shows the content of the internal memory of the candidate generating unit 253 in correspondence to all the operations contained in the program.

FIG. 12 shows the content of the internal memory of the candidate generating unit 253 in correspondence to all the operations contained in the program.

In FIG. 12, the column 1203 shows all of the operations contained in the program shown in FIG. 3. The column 1200 shows the identification numbers of the operations. The column 1201 shows the type-1 op codes corresponding to the operations shown in the column 1203. Similarly, the column 1202 shows the type-2 op codes. The internal memory of the candidate generating unit 253 stores the identification numbers, type-1 op codes, and type-2 op codes respectively shown in the columns 1200, 1201, and 1202 by corresponding them to each other.

The candidate generating unit 253 generates a plurality of candidates being combinations of the type-1 and type-2 op codes stored in the internal memory.

FIG. 13 shows examples of candidates, which are combinations of the type-1 and type-2 op codes, generated by the candidate generating unit 253.

In FIG. 13, the column 1300 shows identification numbers which correspond to the identification numbers of all the operations shown in FIG. 12. Each of the columns 1301, 1302, 1303, . . . shows a candidate, or a combination of the type-1 and type-2 op codes for the entire machine-language instruction sequences. In these columns, "1" indicates the type-1 op code, and "2" indicates the type-2 op code. The column 1301, for example, shows the candidate 1 which is composed of only the type-1 op codes. Similarly, the column 1302 shows the candidate 2 which is composed of the type-1 op codes corresponding to the operations 1 to 5 and the type-2 op code corresponding to the operation 6.

In this way, the candidate generating unit 253 generates a plurality of candidates for op code sequences. Here, the number of the candidates generated by the candidate generating unit 253 may be determined previously (e.g., the maximum number is set to 20), or may be the number of all possible combinations of the type-1 and type-2 op codes.

The selection unit 254 selects one among the plurality of candidates generated by the candidate generating unit 253 that includes the least number of bit changes, where the bit change is a change between successive values in the same digit in the vertically arranged binary numbers. The selection unit 254 stores the selected candidate into the machine-language instruction storage unit 14.

Figure 14:
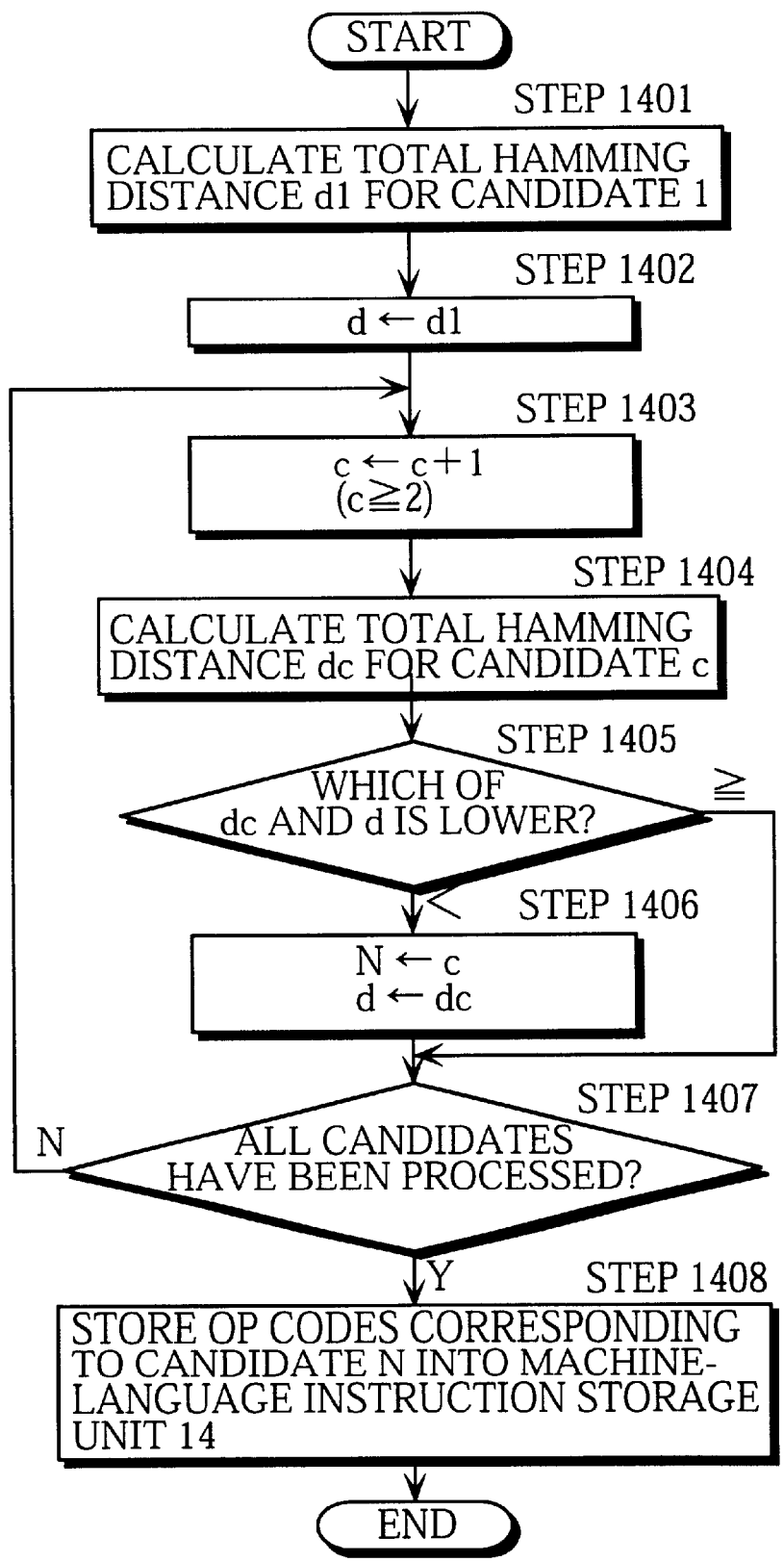
FIG. 14 is a flowchart showing the procedure of the selection unit 254.

FIG. 14 is a flowchart showing the procedure of the selection unit 254.

The selection unit 254 calculates d1 which is a sum of the Hamming distances in terms of the op code sequences in the candidate 1 (step 1401). Hereinafter, the sum is referred to as a total Hamming distance. The selection unit 254 stores the total Hamming distance d1 as d (step 1402).

The steps 1402 to 1407 are repeated for each candidate by increasing a variable c indicating the candidate number in such a way as 2, 3, 4, . . . .

When c=2, the selection unit 254 calculates d2 which is a total Hamming distance in terms of the op code sequences in the candidate 2 (step 1404). The selection unit 254 compares the total Hamming distance d2 with d to decide which is lower. When d2 is lower than d, the selection unit 254 stores d2 as d. At the same time, the selection unit 254 stores the candidate number "c=2" as N. That is to say, N is a variable indicating a candidate number corresponding to the lowest total Hamming distance as of this point in time (steps 1405, 1406).

In this way, the selection unit 254 calculates the total Hamming distances in terms of the op code sequences for each candidate and decides which candidate has the lowest total Hamming, distance. In the final step, the op code sequences corresponding to the candidate number N (i.e., the op code sequences corresponding to the shortest Hamming distance) are stored in the machine-language instruction storage unit 14 (step 1408).

In this way, the program conversion apparatus 20 generates a plurality of candidates in terms of op code sequences for the entire machine-language instruction sequences, where each candidate is composed of op codes which are each either the type-1 or the type-2. The program conversion apparatus 20 then decides one candidate (op code sequences) having the lowest number of digit-bit changes. With this construction, current changes on the instruction buses decrease when the processor reads the converted machine-language instructions including the op code sequences with less bit changes from the program memory for execution. This provides an effect of reducing the power consumption.

Embodiment 3
Program Conversion Apparatus

The program conversion apparatus in Embodiment 3 will be described.

The program conversion apparatus in Embodiment 3 selects one of the two types of operand codes for each register number so that the machine-language instruction sequences have less bit changes, where the bit change is a change between successive values in the same digit in the vertically arranged binary numbers.

Figure 15:
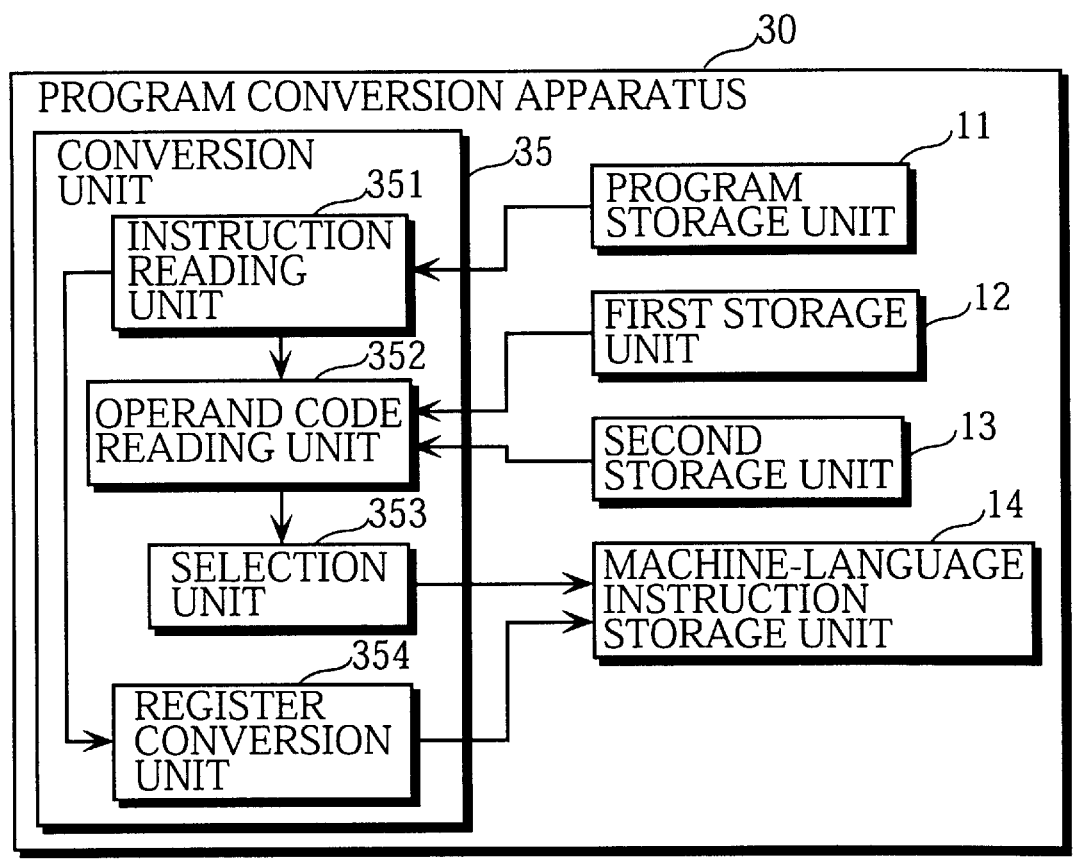
FIG. 15 is a functional block diagram showing the construction of a program conversion apparatus in Embodiment 3 in terms of the functions.

FIG. 15 is a functional block diagram showing the construction of a program conversion apparatus 30 in Embodiment 3 in terms of the functions.

In FIG. 15, the program conversion apparatus 30 includes a program storage unit 11, a first storage unit 32, a second storage unit 33, a machine-language instruction storage unit 14, and a conversion unit 35.

The conversion unit 35 includes an instruction reading unit 351, an operand code reading unit 352, a selection unit 353, and an op code conversion unit 354.

The following description will be focused on the components different from Embodiment 1 and the components with the same reference numbers as Embodiment 1 will not be described.

The first storage unit 32 stores register numbers and operand codes by corresponding them to each other. Hereinafter, the operand codes stored in the first storage unit 32 are referred to as type-1 operand codes.

The second storage unit 33 stores the same register numbers as the first storage unit 32 and also stores operand codes that have different bit patterns from the type-1 operand codes, where the register numbers correspond to the operand codes. Hereinafter, the operand codes stored in the second storage unit 33 are referred to as type-2 operand codes.

The instruction reading unit 351 reads out instructions one at a time from the program storage unit 11, outputs operations contained in the read-out instructions to the op code conversion unit 354, and outputs operands contained in the read-out instructions to the operand code reading unit 352.

The operand code reading unit 352, upon receipt of an operand from the instruction reading unit 351, reads out the type-1 and type-2 operand codes corresponding to the received operand, and outputs the read-out op codes to the selection unit 353.

The selection unit 353 selects an operand code, which renders the Hamming distance from the preceding operand code shorter, out of the type-1 operation code and the type-2 operation code read out by the operation code reading unit 352, and outputs the selected operation code to the machine-language instruction storage unit 14.

The operation code reading unit 352 and the selection unit 353 repeat the above-described processes as many times as there are operands per one instruction.

The op code conversion unit 354 contains a table which shows correspondence between operations and op codes. The op code conversion unit 354 converts the operations received from the operation code reading unit 352 into corresponding op codes by referring to the table, and outputs the op codes to the machine-language instruction storage unit 14.

Detailed Construction of Selection Unit 353

Figure 16:
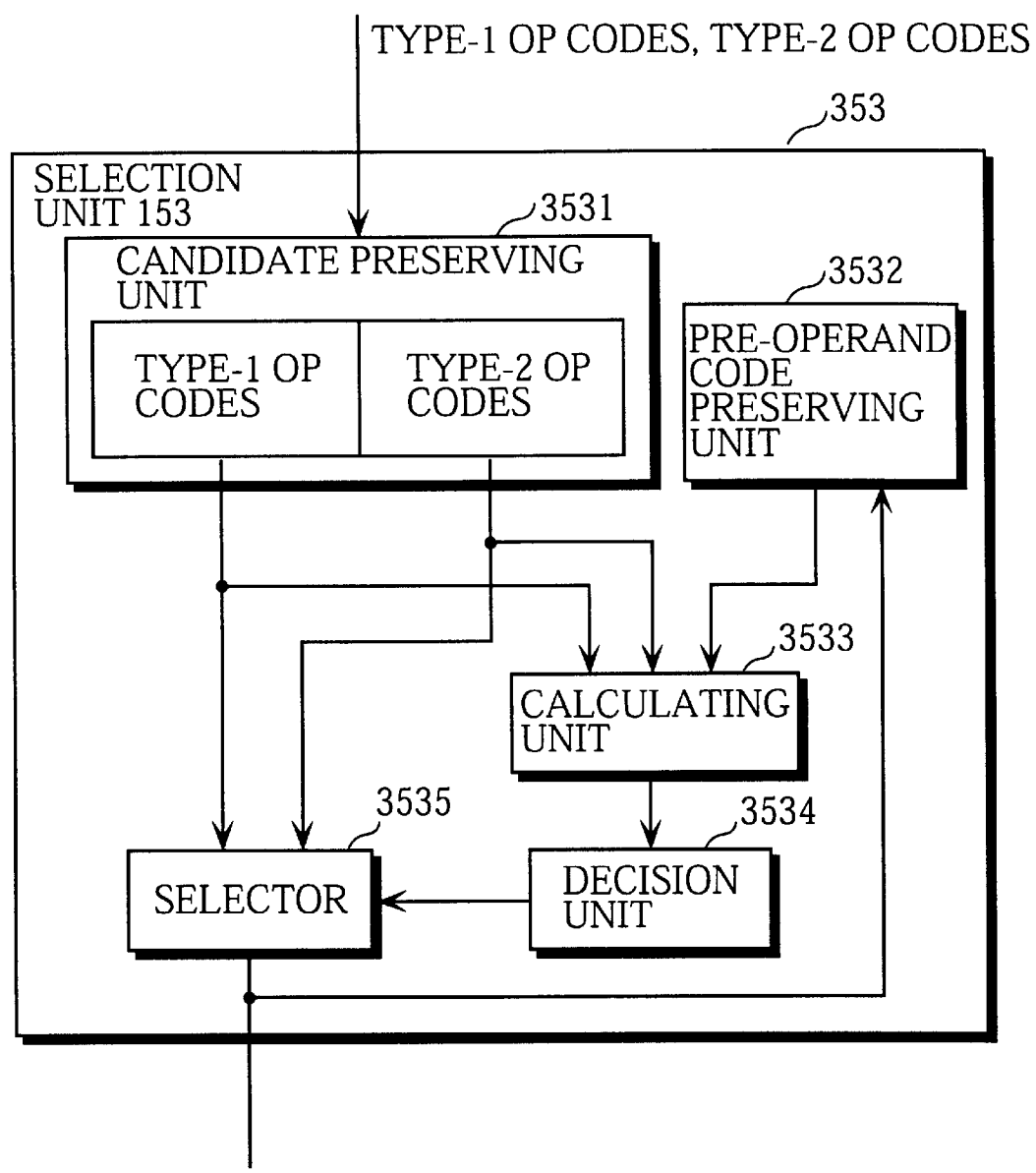
FIG. 16 shows a detailed construction of the selection unit 353.

FIG. 16 shows a detailed construction of the selection unit 353.

The selection unit 353 includes a candidate preserving unit 3531, a pre-operand code preserving unit 3532, a calculating unit 3533, a decision unit 3534, and a selector 3535.

The candidate preserving unit 3531 stores the type-1 operand code and the type-2 operand code input from the operand code reading unit 352.

The pre-operand code preserving unit 3532 has a buffer that can store one operand code, and stores in it one operand code sent from the candidate preserving unit 3531 via the selector 3535. The pre-operand code preserving unit 3532 updates the buffer each time the candidate preserving unit 3531 sends a new operand code by overwriting the old operand code with the new one. Hereinafter, the operand code preserved by the pre-operand code preserving unit 3532 is referred to as pre-operand code.

The calculating unit 3533 calculates d1 which is the Hamming distance between the type-1 operand code preserved by the candidate preserving unit 3531 and the pre-operand code, calculates d2 which is the Hamming distance between the type-2 operand code preserved by the candidate preserving unit 3531 and the pre-operand code, and outputs the obtained Hamming distances d1 and d2 to the decision unit 3534.

The decision unit 3534 compares the Hamming distance d1 with the Hamming distance d2 to decide which is shorter. The decision unit 3534 converts the decision result to a selection signal and outputs the selection signal to the selector 3535. The selection signal is 0 when the Hamming distance d1 is shorter than d2, and 1 when the Hamming distance d2 is shorter than d1. The selection signal is 0 (or 1) when the Hamming distance d1 is equal to d2.

The selector 3535 selects one of the type-1 and type-2 operand codes preserved by the candidate preserving unit 3531 according to the selection signal output from the decision unit 3534, and stores the selected operand code into the machine-language instruction storage unit 14. More specifically, the selector 3535 selects the type-1 op code when it receives 0 as the selection signal and selects the type-2 op code when it receives 1, and outputs the selected op code to the machine-language instruction storage unit 14.

As the above process is repeated, the machine-language instruction storage unit 14 accumulates the operand codes received from the selector, or the operand codes which render the Hamming distances between the successive machine-language instructions in the machine-language instruction sequences shorter.

As described above, the selection unit 353 selects one out of the type-1 and type-2 operand codes that renders the Hamming distance between the operand codes of the successive machine-language instructions shorter, and stores the selected op code into the machine-language instruction storage unit 14, repeating this for each pair of successive instructions.

As describe above, the program conversion apparatus 30 converts a program into machine-language instruction sequences so that the Hamming distance between operand codes of the successive machine-language instructions is reduced. In other words, the machine-language instruction sequences have less bit changes, where the bit change is a change between successive values in the same digit in the vertically arranged binary numbers. With such shorter Hamming distances, current changes on the instruction buses decrease when the processor reads the converted machine-language instructions from the program memory for execution. This provides an effect of reduction in the power consumption.

Embodiment 4
Program Conversion Apparatus

Figure 17:
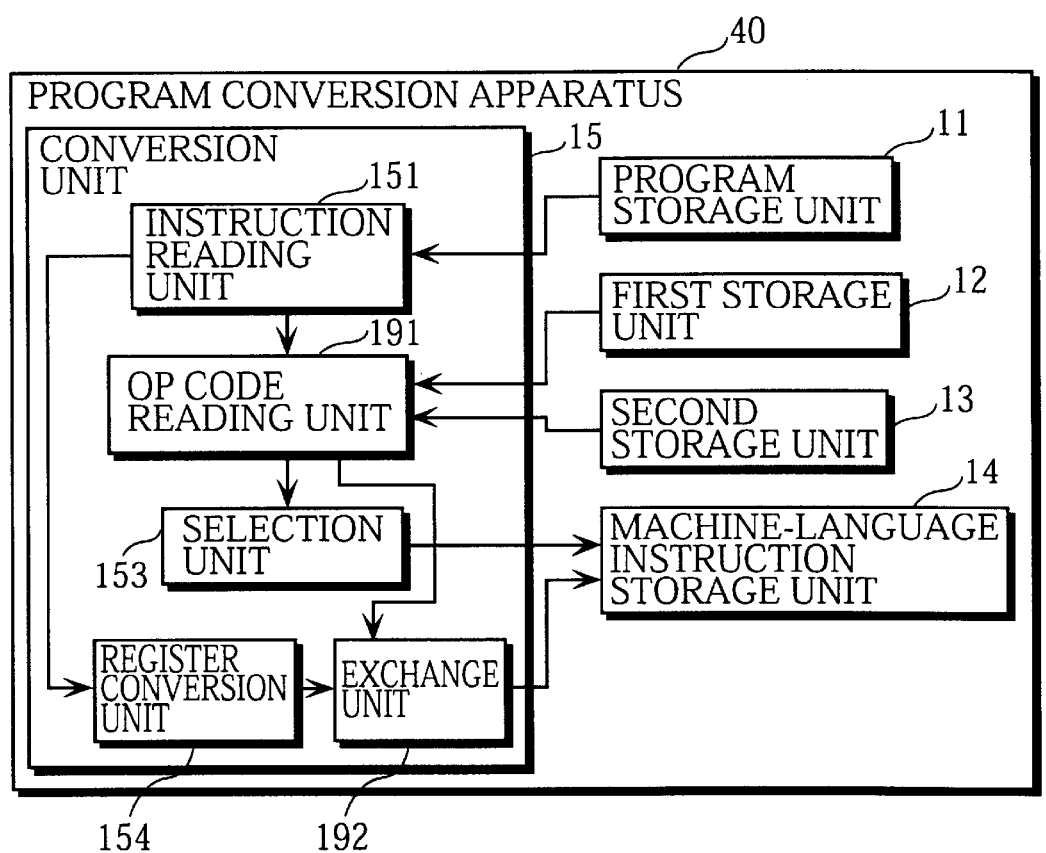
FIG. 17 is a functional block diagram showing the construction of a program conversion apparatus in Embodiment 4 in terms of the functions.

FIG. 17 is a functional block diagram showing the construction of a program conversion apparatus 40 in Embodiment 4 in terms of the functions.

As shown in FIG. 17, the program conversion apparatus 40 differs from the program conversion apparatus 10 shown in FIG. 7 in that it has an op code reading unit 191 instead of the op code reading unit 152, and has an replacing unit 192 between the register conversion unit 154 and the machine-language instruction storage unit 14.

The op code reading unit 191 has the features of the op code reading unit 151 and additionally has functions of detecting an instruction which includes both a source operand and a destination operand, and notifying the replacing unit 192 of the detection. More specifically, the op code reading unit 191 prestores operations each of which is included in an instruction that includes both a source operand and a destination operand. The op code reading unit 191 outputs a detection signal to the replacing unit 192 when the operation output from the op code reading unit 151 matches any of the operations stored in the op code reading unit 191.

Figures 19, 20:
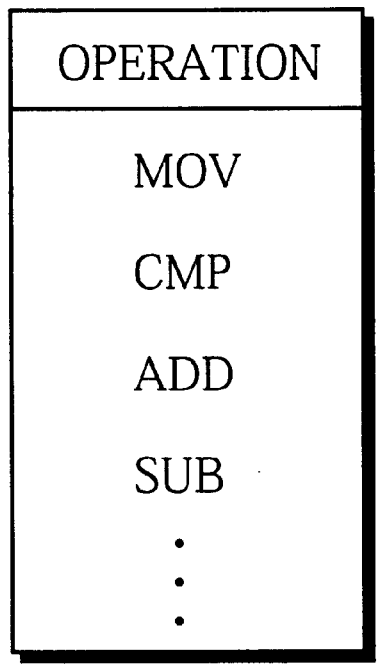
FIG. 19 shows operations prestored in the op code reading unit 191.
FIG. 20 shows examples of programs.

The above process will be described with reference to a program shown in FIG. 20. All of the operations included in the program match any of the operations prestored in the op code reading unit 191. When converting the program, therefore, the op code reading unit 191 outputs the detection signal to the replacing unit 192 each time it receives an operation from the op code reading unit 151.

The replacing unit 192 replaces the source operand code and the destination operand code received from the register conversion unit 154 with each other for alternate inputs of the detection signal, or in other words, every two times it receives, with the same timing as the two operand codes, the detection signal from the op code reading unit 191. The replacing unit 192 stores the two operand codes into the machine-language instruction storage unit 14 by corresponding them to an op code.

The above process will be described with reference to the program shown in FIG. 20. The replacing unit 192 performs the replacement of operand codes for alternate inputs of the detection signal which, in case of the example shown in FIG. 20, correspond to the operands CMP on the second row and ADD on the fourth row. More specifically, when R1,R2 and R3,R4 are originally to be converted into operand codes "00001 00010" and "00011 00100", respectively, the operand codes after replacement are "00010 00001" and "00100 00011", respectively.

The replacing unit 192 stores the operand codes into the machine-language instruction storage unit 14 as they are when it does not perform such a replacement of the operand codes.

FIG. 21 includes the column 2201 which shows the operand codes stored in the machine-language instruction storage unit 14 after the above replacement is performed. In the column 2201, the places where a digit-bit change occurs are encircled. As apparent from the drawing, the number of the digit-bit changes, or the Hamming distance is 6. In the column 2202 which shows the operand codes on which the above replacement is not performed, the Hamming distance is 14. As a result, the operand codes in the column 2201 have less digit-bit changes than column 2202.

As describe above, the program conversion apparatus 40 converts a program into machine-language instruction sequences so that the machine-language instruction sequences have less bit changes in both op code sequences and operation code sequences by performing the replacement of the operand codes, where the bit change is a change between successive values in the same digit in the vertically arranged binary numbers. With such a construction, current changes on the instruction buses decrease when the processor reads the converted machine-language instructions from the program memory for execution. This provides an effect of reduction in the power consumption.

Embodiment 5
Processor

A processor which executes machine-language instruction sequences containing type-1 and type-2 op codes will be described.

Figure 18:
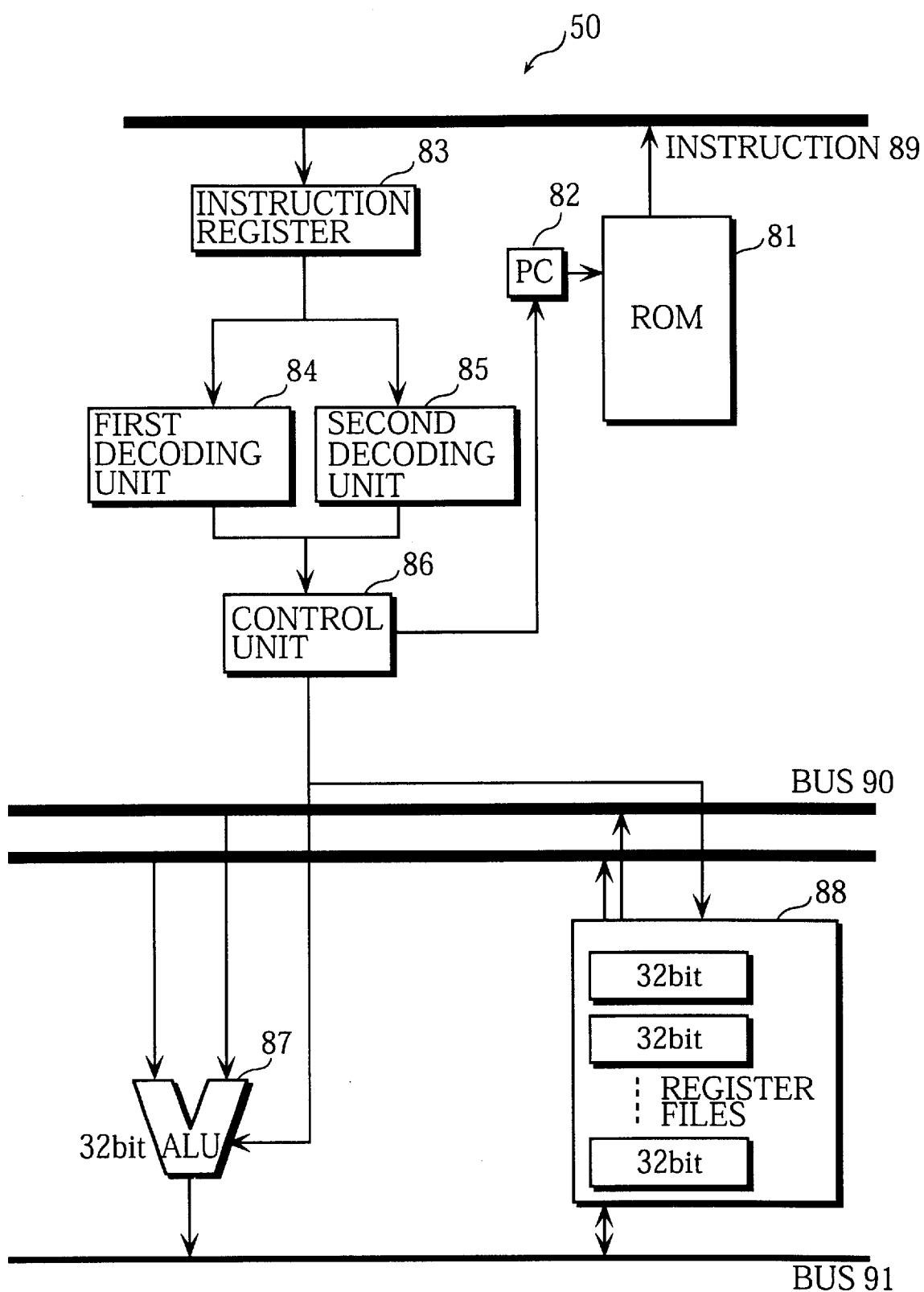
FIG. 18 is a block diagram showing the construction of the processor in the present embodiment.

FIG. 18 is a block diagram showing the construction of the processor in the present embodiment.

As shown in FIG. 18, a processor 50 includes a ROM 81, a program counter (hereinafter referred to as PC) 82, an instruction register 83, a first decoding unit 84, a second decoding unit 85, a control unit 86, an ALU 87, and a register 88. The processor 50 also includes an instruction bus 89, a bus 90, and a bus 91.

The ROM 81 stores machine-language instruction sequences. The machine-language instruction sequences contain type-1 and type-2 op codes. Note that each of the type-1 and type-2 op codes has the same length.

The PC 82 indicates an address of a machine-language instruction to be read out next from the ROM 81.

The instruction register 83 stores a machine-language instruction which is read from a location in the ROM 81 specified by the address indicated by the PC 82 and is sent via the instruction bus 89.

The first decoding unit 84 decodes the machine-language instruction stored in the instruction register 83 when the instruction includes a type-1 op code.

The second decoding unit 85 decodes the machine-language instruction stored in the instruction register 83 when the instruction includes a type-2 op code.

It is supposed that the first decoding unit 84 and the second decoding unit 85 output the same decoding result when the target op codes correspond to the same operation though the op codes have different types.

The control unit 86 executes instructions in accordance with the decoding results output from the first decoding unit 84 and the second decoding unit 85.

The ALU 87 performs arithmetic logic operations under control of the control unit 86.

The register 88 has a plurality of 32-bit registers which are used by the control unit 86.

Figure 22:
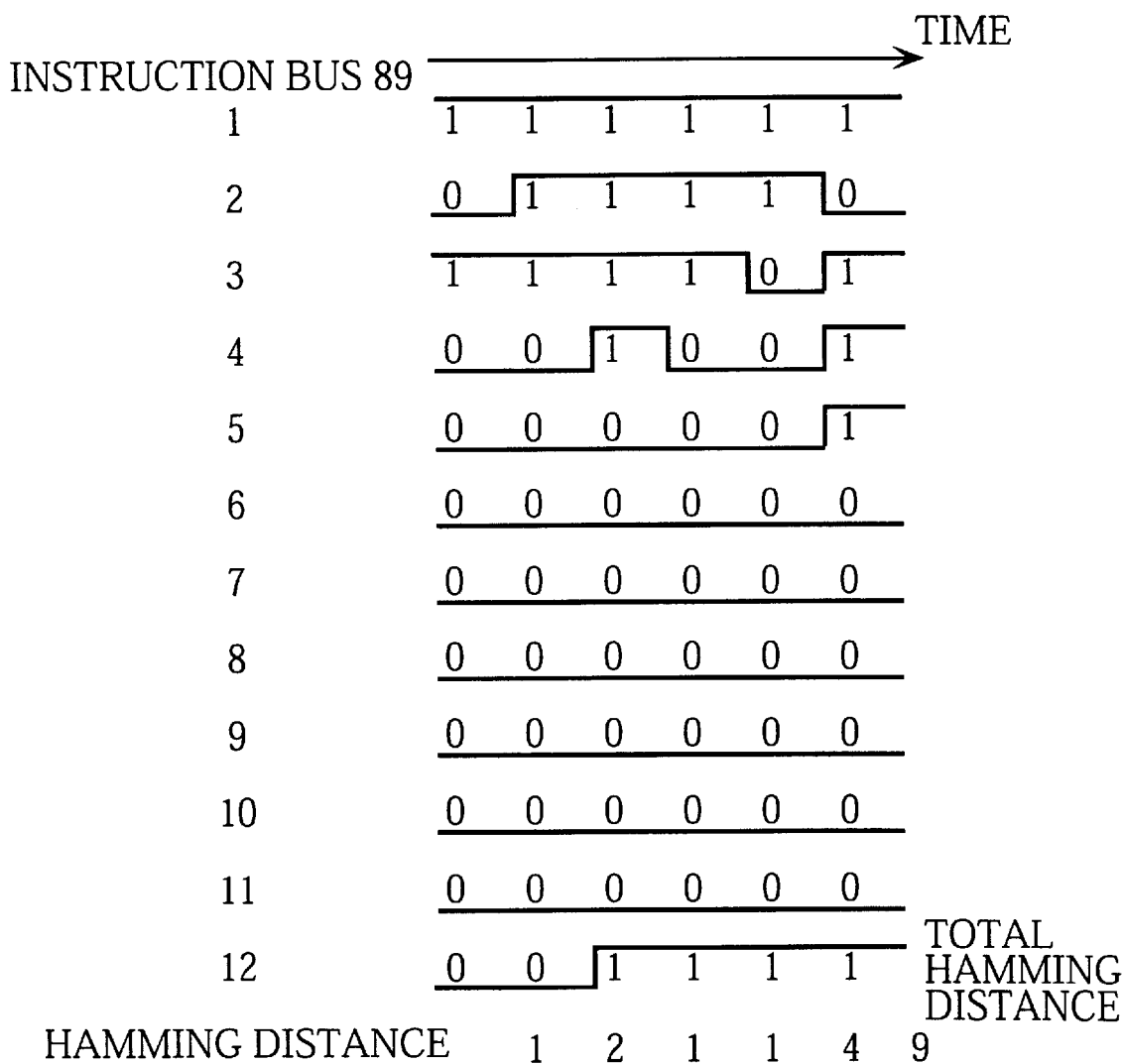
FIG. 22 shows the bit changes in the op code sequences of the machine-language instruction sequences shown in FIG. 10 passing through the instruction bus 89.

FIG. 22 shows the bit changes in the op code sequences of the machine-language instruction sequences shown in FIG. 10 passing through the instruction bus 89.

The instruction bus 89 is composed of 32 signal lines. In FIG. 22, signal lines 1 to 12 of the 32 signal lines are used. The signal line 1 corresponds to the most significant bit of the op code, and the signal line 12 corresponds to the least significant bit. FIG. 22 shows the bit pattern changes in each of the signal lines 1 to 12. The power is consumed at the edge a bit pattern (i.e., a succession of the same bit) where the bit value changes from 0 to 1 or from 1 to 0. The amount of the power consumption when one machine-language instruction is read from the ROM 81 and output to the instruction register 83 is proportionate to the sum of the number of bit changes in each signal line. That means the less number of bit changes the signal lines have, the smaller the power consumption is. The op code sequences shown in FIG. 22 are a mixture of type-1 op codes and type-2 op codes, with the sum of the number of bit changes (Hamming distance) being as low as 9, resulting in small power consumption.

Figure 23:
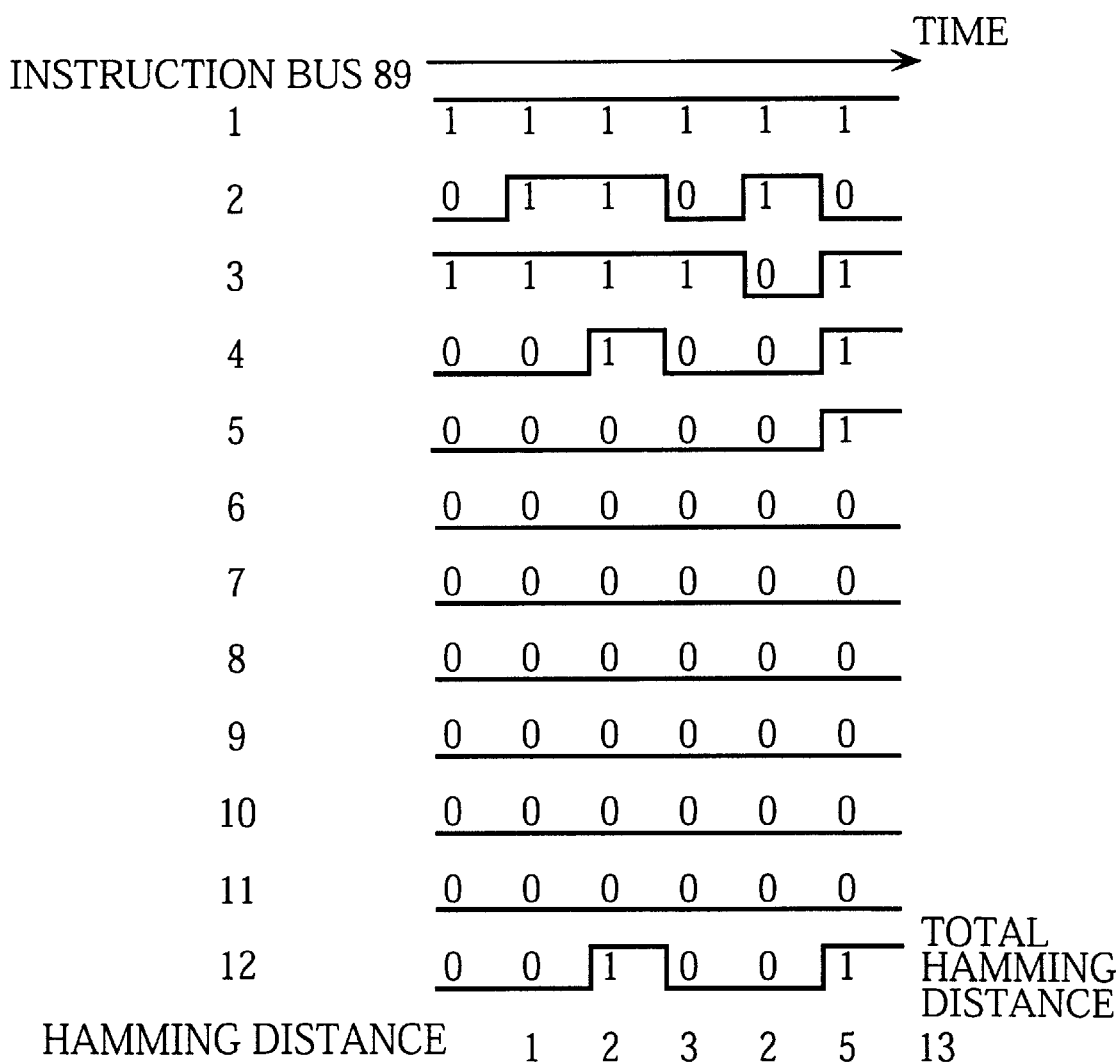
FIG. 23 also shows the bit changes in the op code sequences of the machine-language instruction sequences passing through the instruction bus 89, but the op code sequences are made of only type-2 op codes.

FIG. 23 also shows the bit changes in the op code sequences of the machine-language instruction sequences passing through the instruction bus 89, but the op code sequences are made of only type-2 op codes.

As shown in FIG. 23, the sum of the Hamming distances is 13, which means more power is consumed than the op code sequences shown in FIG. 22.

As described above, the processor 50 can execute machine-language instruction sequences containing type-1 and type-2 op codes, which results in less power consumption by the instruction bus 89 when instructions are read from the ROM 81 for execution.

When the processor 50 executes machine-language instruction sequences generated by the program conversion apparatus 10 or 20 described earlier, the first decoding unit 84 and the second decoding unit 85 decode the type-1 op codes and the type-2 op codes generated by the program conversion apparatus 10 or 20.

Embodiment 6

Processor

A processor 60 which executes machine-language instruction sequences containing two types of operand codes will be described.

The processor 60 differs from the processor 50 shown in FIG. 18 in the functions of the first decoding unit 84 and the second decoding unit 85.

The first decoding unit 84 of the present embodiment decodes the op code of the machine-language instruction stored in the instruction register 83. The first decoding unit 84 also decodes the operand code of the same machine-language instruction when the operand code is the type-1.

The second decoding unit 85 decodes the operand code of the machine-language instruction stored in the instruction register 83 when the operand code is the type-2.

When, for example, the machine-language instruction stored in the instruction register 83 includes one op code and one type-1 operand code and one type-2 operand code, the first decoding unit 84 decodes the op code and the type-1 operand code, and the second decoding unit 85 decodes the type-2 operand code.

As described above, the processor 60 can execute machine-language instruction sequences containing type-1 and type-2 operand codes, which results in less power consumption by the instruction bus 89 when instructions are read from the ROM 81 for execution.

When the processor 60 executes machine-language instruction sequences generated by the program conversion apparatus 30, the first decoding unit 84 and the second decoding unit 85 decode the type-1 operand codes and the type-2 operand codes stored in the first storage unit 32 and the second storage unit 33.

Embodiment 7

Processor

A processor 70 which executes machine-language instruction sequences by replacing source operand codes and destination operand codes with each other will be described.

The processor 70 differs from the processor 50 shown in FIG. 18 in that is has a replacing unit between (a) the instruction register 83 and (b) the first decoding unit 84 and the second decoding unit 85.

The replacing unit judges whether an instruction stored in the instruction register 83 includes both a source operand and a destination operand, and replaces the source operand code and the destination operand code with each other every two times it judges so, and outputs the operand codes to the first decoding unit 84 and the second decoding unit 85.

As described above, the processor 70 can execute machine-language instruction sequences by replacing source operand codes and destination operand codes with each other, which results in less power consumption by the instruction bus 89 when instructions are read from the ROM 81 for execution.

Other Embodiments

The present invention is not limited to the above-described embodiments, but can be achieved as other various embodiments. The following are such examples.

(1) The program conversion apparatus 10 may be configured to shorten the Hamming distance between a branch instruction and an instruction including a label indicating the destination of the branch instruction (more specifically, between the op codes of these instructions). Such branch instructions are "BEQ", "J" (Jump), etc.

To achieve the above feature, the construction of the program conversion apparatus 10 shown in FIGS. 7 and 8 may be modified as follows.

The op code reading unit 152 further judges whether an operation output from the instruction reading unit 151 is a branch instruction, and if having judged so, outputs a judgement signal S1 to the pre-op code preserving unit 1532 in the selection unit 153. As a specific example to achieve the above function, the op code reading unit 152 may prestore operations of branch instructions, and output the judgement signal S1 if an operation output from the instruction reading unit 151 matches any of the branch-instruction operations.

In the above case, the op code reading unit 152 also outputs a signal S2 to the selection unit 153 when having detected an operation of an instruction including a label corresponding to the branch instruction.

The pre-op code preserving unit 1532 has a buffer for storing op codes of branch instructions, as well as the buffer for storing pre-op codes. Upon receipt of the judgement signal S1, the pre-op code preserving unit 1532 stores a branch-instruction op code that is input via the selector 1535 with the same timing as the judgement signal Si.

The calculation unit 1533 calculates d1 and d2, and further calculates db1 which is the Hamming distance between the type-1 op code preserved by the candidate preserving unit 1531 and the branch-instruction op code preserved by the pre-op code preserving unit 1532, calculates db2 which is the Hamming distance between the type-2 op code and the branch-instruction op code. The calculation unit 1533 outputs the Hamming distances d1, d2, db1, and db2 to the decision unit 1534.

Upon receipt of the Hamming distances d1, d2, db1, and db2, the decision unit 1534 decides which of the type-1 op code and the type-2 op code should be selected, converts the decision result to a selection signal and outputs the selection signal to the selector 1535.

The decision unit 1534 may perform one of the following processes for the decision, for example.

(i) When d1 or db1 is the shortest among the above four Hamming distances, the decision unit 1534 decides that the type-1 op code should be selected and outputs 0 as the selection signal. When d2 or db2 is the shortest Hamming distance, the decision unit 1534 decides that the type-2 op code should be selected and outputs 1 as the selection signal.

(ii) The decision unit 1534 calculates the average av1 of the Hamming distances d1 and db1, calculates the average av2 of the Hamming distances d2 and db2, and compares av1 with av2. When av1 is lower than av2, the decision unit 1534 decides that the type-1 op code should be selected and outputs 0 as the selection signal. When av2 is lower than av1, the decision unit 1534 decides that the type-2 op code should be selected and outputs 1 as the selection signal.

(iii) The decision unit 1534 compares d1 with d2, and compares db1 and db2. When d1 is lower than d2 and db1 is lower than db2, the decision unit 1534 decides that the type-1 op code should be selected and outputs 0 as the selection signal. When d2 is lower than d1 and db2 is lower than db1, the decision unit 1534 decides that the type-2 op code should be selected and outputs 1 as the selection signal. In any other cases (i.e., when d1 is lower than d2 and db2 is lower than db1, and when d2 is lower than d1 and db1 is lower than db2), the decision unit 1534 decides that the type-1 op code should be selected and outputs 0 as the selection signal when db1 is lower than db2, and decides that the type-2 op code should be selected and outputs 1 as the selection signal when db2 is lower than db1, regardless of the values of d1 and d2.

(iv) The decision unit 1534 compares db1 and db2. When db1 is lower than db2, the decision unit 1534 decides that the type-1 op code should be selected and outputs 0 as the selection signal. When db2 is lower than db1, the decision unit 1534 decides that the type-2 op code should be selected and outputs 1 as the selection signal. The decision unit 1534 does not use the Hamming distances d1 and d2 for the decision.

With the above constructions, when the branch instructions in the machine-language instruction sequences have higher possibility of branching than not branching, the power consumption by the processor executing the machine-language instruction sequences is effectively reduced.

(2) The program conversion apparatus 10 may assign one of the following bit patterns (i) to (iii) to the type-1 and type-2 op codes, and store the bit patterns in the first storage unit 12 and the second storage unit 13, respectively. With this construction, the program conversion apparatus can convert the source program into machine-language instruction sequences having less digit-bit changes in terms of the operations.

(i) Bit patterns which are each the inverse of the other are assigned to the type-1 and type-2 op codes. For example, when the type-1 op code corresponding to "MOV" is "01011", "10100" being the inverse of "01011" is assigned to the type-2 op code. Bit patterns are assigned in the same way for other operations. With this construction, the Hamming distance between the op codes of two successive instructions is 3 when selecting op codes of one type, and 2 (=5−3) when selecting op codes of the other type. Suppose the Hamming distance is da when the type-1 op code is selected and that each op code has n bits, then the Hamming distance is db=n−da when the type-2 op code is selected.

When the program conversion apparatus 10 generates L lines of machine-language instruction sequences using the above op codes, the sum total of the Hamming distances of the L lines of machine-language instruction sequences in terms of the op codes is secured to be [n/2]*L or less, where n represents the number of bits in each op code, and [n/2] represents an integer section of n/2 obtained by dropping the fractional portion of the number.

(ii) Two types of op codes may be assigned to only the operations that have higher frequency of appearing in a program. For example, when "ADD" has a high frequency of appearing in the program, two types of op codes are assigned to "ADD" and one type is assigned to the other operations. This will be explained with reference to the construction shown in FIG. 2. The first storage unit 12 stores type-1 op codes which correspond to all the operations. The second storage unit 13 stores type-2 op codes which correspond to only "ADD", an operation having a high frequency of appearing in the program. With such a construction, two types of op codes are not assigned to operations with low frequency of appearance. This reduces the capacity of the second storage unit 13.

(iii) Two types of op codes may be assigned to the operations that have high frequency of appearing as two successive operations in the program so that the Hamming distance between these operations becomes the shortest. For example, when "CMP" and "BEQ" have high frequency of appearing as two successive operations in the program, two types of op codes are assigned to them so that the Hamming distance between them is 1. More specifically, "00111" and "11000" are assigned to "CMP" as the type-1 and type-2 op codes, respectively. "00011" and "11100" are assigned to "BEQ" as the type-1 and type-2 op codes, respectively. With this construction, the program conversion apparatus 10 can select a type-1 or type-2op code corresponding to "BEQ" so that the Hamming distance between "CMP" and "BEQ" is always 1 regardless of which of the type-1 and type-2 op codes is selected for "CMP".

(3) In the program conversion apparatus 20, the candidate generating unit 253 generates a plurality of candidates for the entire machine-language instruction sequences. The selection unit 254 then obtains the Hamming distance of each of the generated candidates by calculation, and selects a candidate that has the shortest Hamming distance. In this case, all the candidates generated by the candidate generating unit 253 need to be stored. This requires a memory having enough capacity to store the candidates.

To reduce the memory capacity required to store the candidates, the candidate generating unit 253 and the selection unit 254 may simultaneously perform the generation of the candidates, calculation of the Hamming distance, and selection of a candidate having the shortest Hamming distance, in this order. In this construction, each time the candidate generating unit 253 generates a candidate, the selection unit 254 calculates the Hamming distance of the candidate, compares the Hamming distance with each previously obtained Hamming distance, and store the candidate and the Hamming distance only when it is shorter than the previous ones. This reduces the memory capacity since the memory does not need to store all the generated candidates.

(4) In the program conversion apparatuses 10 and 20, the selection units may attach to each op code output from the conversion unit an identification bit indicating whether the op code is the type-1 or the type-2.

(5) Components of the program conversion apparatus 30 may be added to the program conversion apparatus 10 or 20 to shorten the Hamming distance for both the op codes and the operand codes.

More specifically, in the case where the components of Embodiment 1 and Embodiment 3 are combined, the op code conversion unit 354 shown in FIG. 15 includes the op code reading unit 152, the selection unit 153, the first storage unit 12, and the second storage unit 13. In the case where the components of Embodiment 2 and Embodiment 3 are combined, the op code conversion unit 354 shown in FIG. 15 includes the op code reading unit 152, the candidate generating unit 253, the selection unit 254, the first storage unit 12, and the second storage unit 13.

(6) The program conversion apparatus 30 may generate a plurality of candidates in terms of the operand codes as the program conversion apparatus 20 does in terms of the op codes. The program conversion apparatus 30 then selects one candidate that has the least number of bit changes. In this case, the selection unit 353 is replaced by an operand code sequence generating unit and a candidate selection unit. The operand code sequence generating unit corresponds to the candidate generating unit 253 in the program conversion apparatus 20, and the candidate selection unit corresponds to the selection unit 254. The functions of these units are as follows.

The operand code sequence generating unit generates a plurality of candidates being selective combinations of the type-1 and type-2 operand codes which are sequentially read out from the operand code reading unit 352.

The candidate selection unit selects one among the plurality of candidates generated by the operand code sequence generating unit that includes the least number of bit changes, and stores the selected candidate into the machine-language instruction storage unit 14.

With the above construction, the total sum of the Hamming distances contained in the machine-language instruction sequences is reduced, and the power consumption by the current change in the instruction bus when the processor reads instructions from the program memory for execution becomes less.

(7) In (6) above, to reduce the memory capacity required to store the candidates, the operand code sequence generating unit and the candidate selection unit may simultaneously perform the generation of the candidates, calculation of the Hamming distance, and selection of a candidate having the shortest Hamming distance, in this order. In this construction, each time the operand code sequence generating unit generates a candidate, the candidate selection unit calculates the Hamming distance of the candidate, compares the Hamming distance with each previously obtained Hamming distance, and store only a candidate having a shorter Hamming distance. With this construction, the memory requires a capacity to store two candidates at the most. This reduces the memory capacity compared to the case where the memory needs to store all the generated candidates.

(8) In the program conversion apparatus 30, the selection unit 353 may attach to each converted operand code an identification bit indicating whether the operand code is the type-1 or the type-2.

(9) In the program conversion apparatus 40, the replacing unit 192 replaces the source operand code and the destination operand code with each other for alternate inputs of the detection signal. The replacing unit 192 however may replace the source operand code and the destination operand code with each other for alternate inputs of the operand code from the register conversion unit 154, and store the operand code in the machine-language instruction storage unit 14 by corresponding it to op codes. This construction eliminates the detection signal and outputting of the detection signal by the op code reading unit 191.

(10) In the program conversion apparatus 40, each machine-language instruction may include a bit indicating whether the source operand code and the destination operand code have been replaced with each other. In this case, the replacing unit 192 sets the bit to 1 when it has replaced the operand codes, and sets the bit to 0 when it has not replaced the operand codes.

(11) In the program conversion apparatus 40, the replacing unit 192 may replace the source operand code and the destination operand code with each other for alternate inputs of the operand code (i.e., for alternate operand codes) from the register conversion unit 154 when a detection signal is input from the op code reading unit 192.

(12) The processor 50 may execute machine-language instructions whose op codes each include an identification bit indicating whether the op code is the type-1 or the type-2. In this case, the processor 50 further includes an identification unit which identifies the type of the op code, in addition to the components shown in FIG. 18. The identification unit identifies the type of the op code by referring to the identification bit to determine whether the op code is the type-1 or the type-2, and allows either the first decoding unit 84 or the second decoding unit 85 to decode and execute the machine-language instruction in accordance with the identification result.

(13) In the processor 50, either the first decoding unit 84 or the second decoding unit 85 may decode the operand code. For example, the first decoding unit 84 decodes the type-1 op code, and the second decoding unit 85 decodes the type-2 op code and the operand code of each machine-language instruction.

(14) The processor 60 may execute machine-language instructions whose operand codes each include an identification bit indicating whether the operand code is the type-1 or the type-2. In this case, the processor 60 further includes an identification unit which identifies the type of the operand code, in addition to the components shown in FIG. 18. The identification unit identifies the type of the operand code by referring to the identification bit to determine whether the operand code is the type-1 or the type-2, and allows either the first decoding unit 84 or the second a decoding unit 85 to decode and execute the machine-language instruction in accordance with the identification result.

(15) When all the machine-language instructions in converted machine-language instruction sequences have both the source and destination operand codes and when the source operand code and the destination operand code in alternate machine-language instructions have been replaced with each other, the first decoding unit and the second decoding unit of the processor 70 may judge whether a machine-language instruction has source and destination operand codes having been replaced based on the address of the machine-language instruction in the ROM 81, or the value indicated by the PC 82, and either the first decoding unit or the second decoding unit may decode the machine-language instruction.

(16) In Embodiments 1 to 3, one of two types of op codes or operand codes is selected for each instruction contained in the source program and the instructions including the selected codes are converted into the machine language instruction sequences. However, the number the types of op codes or operand codes is not limited to two, but may be three or more. When three or more types of codes are provided, the one that renders the Hamming distance between two successive machine-language instructions the shortest may be selected. Alternatively, first the one that renders the Hamming distance the longest may be eliminated, then the one that renders the Hamming distance the shortest may be selected from the remainders.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A program conversion apparatus for converting a source program into machine-language instructions to be executed by a processor, the processor reading out the machine-language instructions sequentially from a memory unit via a bus, the program conversion apparatus comprising:

a program storage means for storing the source program which includes a plurality of instructions, each instruction specifying an operation;

a machine-language storage means for storing a plurality of sets of two types of operation codes, each set corresponding to an operation, the two types of operation codes in each set having different bit patterns, wherein each operation code stored in the machine-language storage means is determined so that a Hamming distance between (i) each of two operation codes corresponding to an operation specified by one of a pair of instructions having a frequency level, higher than a threshold value, of appearing as two successive instructions in the source program and (ii) at least one of two operation codes corresponding to an operation specified by the other of the pair of instructions is always 1; and a conversion means for converting the plurality of instructions stored in the program storage means into the machine-language instructions, wherein the conversion means converts a portion of each instruction specifying an operation selectively into one of the two types of operation codes so that changes in logical states of signal lines composing the bus are fewest for the machine-language instructions, wherein each digit of each machine-language instruction resulted from the conversion by the conversion means corresponds to one of the signal lines, and the conversion means converts the plurality of instructions one by one and in each conversion selects either of the two types of operation codes, the conversion means including;

a reading means for reading, for each operation specified by each instruction, two types of operation codes corresponding to an operation from the machine-language storage means;

a calculating means for calculating the number of changes in digit values in terms of corresponding digits between (i) an operation code that has been selected most recently and (ii) each of the read two types of operation codes contained in an instruction that follows an instruction having the most recently selected operation code;

a judging means for judging which of the two types of operation codes has a smaller number of changes; and a selecting means for selecting an operation code having been judged as having the smaller number of changes, from the two types of operation codes.

2. A computer-readable record medium recording a program that causes a computer to perform a program conversion process for converting a source program into machine-language instructions to be executed by a processor, the processor reading out the machine-language instructions sequentially from a memory unit via a bus, the program conversion process comprising:

a program reading step for reading, from a memory, the source program which includes a plurality of instructions, each instruction specifying an operation;

an operation code assigning step for assigning, to each operation, two types of operation codes having different bit patterns, wherein each operation code is assigned so that a Hamming distance between (i) each of two operation codes corresponding to an operation specified by one of a pair of instructions having a frequency level, higher than a threshold value, of appearing as two successive instructions in the source program and (ii) at least one of two operation codes corresponding to an operation specified by the other of the pair of instructions is always 1; and a conversion step for converting the plurality of instructions read in the program reading step into the machine-language instructions, wherein the conversion step converts a portion of each instruction specifying an operation selectively into one of the two types of operation codes so that changes in logical states of signal lines composing the bus are fewest for the machine-language instructions, wherein each digit of each machine-language instruction resulted from the conversion in the conversion step corresponds to one of the signal lines, and the conversion step converts the plurality of instructions one by one and in each conversion selects either of the two types of operation codes, the conversion step including:

a reading step for reading, for each operation specified by each instruction, two types of operation codes corresponding to an operation;

a calculating step for calculating the number of changes in digit values in terms of corresponding digits between (i) an operation code that has been selected most recently and (ii) each of the read two types of operation codes contained in an instruction that follows an instruction having the most recently selected operation code;

a judging step for judging which of the two types of operation codes has a smaller number of changes; and a selecting step for selecting an operation code having been judged as having the smaller number of changes, from the two types of operation codes.

3. In a program conversion apparatus for converting a source program into machine-language instructions to be executed by a processor, the processor reading out the machine-language instructions sequentially from a memory unit via a bus, the program conversion apparatus including:

a program storage means for storing the source program including a plurality of instructions, each instruction specifying an operation;

a machine-language storage means for storing a plurality of sets of two types of operation codes, each set corresponding to an operation, the two types of operation codes in each set having different bit patterns; and a conversion means for converting the plurality of instructions stored in the program storage means into the machine-language instructions, the conversion means converting a portion of each instruction specifying an operation selectively into one of the two types of operation codes so that changes in logical states of signal lines composing the bus are reduced for the machine-language instructions, the improvement to the program conversion apparatus comprising:

the machine-language storage means being determined so that a Hamming distance between each of two operation codes corresponding to an operation specified by one of a pair of instructions having a frequency level, higher than a predetermined threshold value, of appearing as two successive instructions in the source program and at least one of two operation codes corresponding to an operation specified by the other of the pair of instructions is always 1.

* * * * *